(12) United States Patent
Ma et al.

(10) Patent No.: US 9,532,386 B2
(45) Date of Patent: Dec. 27, 2016

(54) INITIAL ACCESS CHANNEL FOR SCALABLE WIRELESS MOBILE COMMUNICATION NETWORKS

(71) Applicant: Apple Inc., Cupertino, CA (US)

(72) Inventors: Jianglei Ma, Kanata (CA); Hua Xu, Nepean (CA); Ming Jia, Ottawa (CA); Sarah Boumendil, Billancourt (FR); Evelyne Le Strat, Paris (FR); Hang Zhang, Nepean (CA); Peiying Zhu, Kanata (CA); Wen Tong, Ottawa (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/679,524

(22) Filed: Apr. 6, 2015

(65) Prior Publication Data

US 2015/0257175 A1    Sep. 10, 2015

Related U.S. Application Data

(62) Division of application No. 11/992,737, filed as application No. PCT/CA2006/001595 on Sep. 28, 2006, now abandoned.
(Continued)

(51) Int. Cl.
*H04W 74/08* (2009.01)
*H04L 1/06* (2006.01)
(Continued)

(52) U.S. Cl.
CPC ............ *H04W 74/0891* (2013.01); *H04L 1/06* (2013.01); *H04L 5/023* (2013.01); *H04L 27/2627* (2013.01);
(Continued)

(58) Field of Classification Search
None
See application file for complete search history.

(56) References Cited

U.S. PATENT DOCUMENTS

| 5,867,478 A | 2/1999 | Baum et al. |
| 6,141,393 A | 10/2000 | Thomas et al. |

(Continued)

FOREIGN PATENT DOCUMENTS

| WO | 03/034642 | 4/2003 |
| WO | 2004049618 | 6/2004 |

(Continued)

OTHER PUBLICATIONS

U.S. Appl. No. 11/992,737, filed Mar. 28, 2008, Jianglei Ma.
(Continued)

*Primary Examiner* — Sulaiman Nooristany
(74) *Attorney, Agent, or Firm* — Meyertons, Hood, Kivlin, Kowert & Goetzel, P.C.

(57) ABSTRACT

Physical layer structures and access schemes for use in such networks are described and in particular initial access channel (IACH) structures are proposed. A spectrum efficient downlink (DL) IACH design supports different types of User Equipment (UE) capabilities and different system bandwidths. An IACH includes the synchronization channel (SCH) and broadcast-control channel (BCH). A non-uniform SCH for all system bandwidths is provided, as well as scalable bandwidth BCH depending on system bandwidth. An initial access procedure is provided, as well as an access procedure.

20 Claims, 22 Drawing Sheets

Related U.S. Application Data

(60) Provisional application No. 60/722,744, filed on Sep. 30, 2005, provisional application No. 60/759,388, filed on Jan. 17, 2006, provisional application No. 60/814,471, filed on Jun. 15, 2006.

(51) Int. Cl.
    *H04L 5/02*     (2006.01)
    *H04W 74/00*     (2009.01)
    *H04L 27/26*     (2006.01)

(52) U.S. Cl.
CPC ....... *H04W 74/006* (2013.01); *H04W 74/0866* (2013.01); *H04L 1/0618* (2013.01); *H04L 27/2657* (2013.01); *H04L 27/2662* (2013.01)

(56) References Cited

U.S. PATENT DOCUMENTS

| | | |
|---|---|---|
| 6,597,729 B1 | 7/2003 | Schmidl et al. |
| 6,654,429 B1 | 11/2003 | Li |
| 6,834,046 B1 | 12/2004 | Hosur et al. |
| 7,313,086 B2 | 12/2007 | Aizawa |
| 7,436,757 B1 | 10/2008 | Wilson et al. |
| 7,751,510 B2 | 7/2010 | Budianu et al. |
| 7,830,976 B2 | 11/2010 | Gorokhov et al. |
| 8,027,243 B2 | 9/2011 | Jin et al. |
| 2003/0072254 A1 | 4/2003 | Ma et al. |
| 2003/0072255 A1 | 4/2003 | Ma et al. |
| 2003/0072395 A1 | 4/2003 | Jia et al. |
| 2004/0062191 A1 | 4/2004 | Lacroix-Penther et al. |
| 2004/0081073 A1 | 4/2004 | Walton et al. |
| 2004/0085946 A1 | 5/2004 | Morita et al. |
| 2004/0218682 A1 | 11/2004 | Nam et al. |
| 2004/0246998 A1 | 12/2004 | Ma et al. |
| 2005/0084042 A1 | 4/2005 | Van Houtum |
| 2005/0163194 A1 | 7/2005 | Gore et al. |
| 2005/0163238 A1 | 7/2005 | Fujii |
| 2005/0202822 A1 | 9/2005 | Park et al. |
| 2006/0046734 A1 | 3/2006 | Costa et al. |
| 2006/0067416 A1 | 3/2006 | Tirkkonen et al. |
| 2007/0041456 A1 | 2/2007 | Jahan et al. |
| 2007/0064669 A1 | 3/2007 | Classon et al. |
| 2007/0070944 A1* | 3/2007 | Rinne ................. H04B 7/0669 370/329 |
| 2007/0258404 A1 | 11/2007 | Tirkkonen et al. |
| 2008/0253279 A1 | 10/2008 | Ma et al. |
| 2009/0225885 A1 | 9/2009 | Aoki et al. |
| 2010/0098031 A1* | 4/2010 | Charbit ................ H04J 11/0069 370/336 |

FOREIGN PATENT DOCUMENTS

| | | |
|---|---|---|
| WO | 2005/057870 | 6/2005 |
| WO | 2005/125044 | 12/2005 |
| WO | 2006/034577 | 4/2006 |

OTHER PUBLICATIONS

Ericsson et al., "Text Proposal on Cell Search in Evolved UTRA", 3GPP Draft; R1-051308 JTP Cell Search, 3rd Generation Partnership Project (3GPP), Mobile Competence Centre; Nov. 1, 2005, 4 pages.

Mino et al.; "WINNER II intramode and intermode cooperation schemes definition;" Information Society Technologies (1st) Winner II 04.8.1 v1.0, Jun. 30, 2006, retrieved from <http://projects.celtic-initiative.org/winner+/WINNER2-Deliverables/04.8.1_v1.0 .. pdf> on Mar. 12, 2013; pp. 67-68, figure 4-2.

3GPP TR 25.814 v0.1.1 "3rd Generation Partnership Project; Technical Specification Group Radio Access Network; Physical Layer Aspects for Evolved UTRA (Release 7)" (Jun. 2005), pp. 1-28.

NTT DoCoMo, "Physical Channel Concept for Scalable Bandwidth in Evolved UTRA Downlink", 3GPP TSG RAN WG1 Ad Hoc on L TE R1-050592, Jun. 16, 2005, 14 pages.

3GPP TR 25.913, "3'd Generation Partnership Project; Technical Specification Group Radio Access Network; Requirements for Evolved UTRA (E-UTRA) and Evolved UTRAN (E-UTRAN)", V7.0.0, Jun. 1, 2005, 15 paqes.

3GPP Draft: R2-052045_L TE_Channel, 3'd Generation Partnership Project (3GPP), Mobile Competence Centre, Aug. 26, 2005, 3 pages.

Ericsson et al., "UE Capability on Supportable Bandwidths", 3GPP Draft; R1-051309 UE Capability, 3rd Generation Partnership Project (3GPP), Mobile Competence Centre, Nov. 1, 2005, 6 pages.

Nortel, "Proposal for initial access channel for E-UTRA (SCH and BCH)", 3GPP TSG RAN WG1 L TE ad hoc, Jan. 18, 2006, 18 pages, ht1o://!ist.etsi.ora/scriots/wa.exe?A2-ind0601 &L~~aoo tsa ran wai & T -0&0-A&P-a553.

NTT DoCoMo, "Cell Search Method in Connected and Idle Mode for E-UTRA Downlink", 3GPP Draft; R1-060163 DL Cell Search Operation in Idle Mode, 3'd Generation Partnership Project (3GPP), Mobile Competence Centre, Jan. 19, 2006, 3 pages.

Nortel, "Proposal for the Downlink Synchronization Channel for E-UTRA", 3GPP Draft; R1-051156, 3'd Generation Partnership Project (3GPP), Mobile Competence Centre, Oct. 4, 2005, 12 pa!=jes.

Texas Instruments, "Downlink Synchronization Channel Schemes for E-UTRA", 3GPP Draft, R1-050725_Cell Search, 3'd Generation Partnership Project (3GPP), Mobile Competence Centre, Aug. 25, 2005, 12 pages.

NTT DoCoMo, "Physical Channels and Multiplexing in Evolved UTRA Downlink", 3GPP Draft; R1-050590_Physical Channels and Multiplexing IN DL, 3'd Generation Partnership Project (3GPP), Mobile Competence Centre, Jun. 16, 2005, 24 pa!=jes.

ZTE, "Comparing of Two Downlink Synchronization Channel Schemes for E-UTRA", 3GPP Draft, R1-051357 Comparing of Downlink Synchronization Channel Schemes for E-UTRA, 3'd Generation Partnership Project (3GPP), Mobile Competence Centre, Oct. 31, 2005, 6 pages.

Texas Instrument, "An alternative scheme to detect the STTD encoding of PCCPCH", TSG-RAN WG1 Meeting 3, Mar. 26, t999, URL: http://www.3gpp.org/ftp/tsg_ran/WGt_RL t/TSGR1_03/Docs/pdfs/Rt-99150.PDF.

Nortel, "BCH Detection Performance Evaluation", 3GPP TSG-RAN working group 1 meeting 46, Sep. 1, 2006, URL: http://www.3gpp.org/ftp/tsg ran/WG1 RL1/TSGR1 46/Docs/R1-062141.

Dabak A. G. et al., "A comparison of the open loop transmit diversity schemes for third generation wireless systems", Wireless communications and networking conference, 2000, WCNC, 2000 IEEE, Sep. 23-28, 2000, pp. 437-442.

Dammann A. et al., "Transmit/Receive-antenna diversity techniques for OFDM systems", European Transactions on Telecommunications, Wiley & Sons, Chichester, GB, vol. 13, No. 5, Sep. 1, 2002, pp. 531-538.

\* cited by examiner

INITIAL ACCESS CHANNEL FOR SCALABLE WIRELESS MOBILE COMMUNICATION NETWORKS

CROSS-REFERENCE TO RELATED APPLICATIONS

This application is a divisional of U.S. application Ser. No. 11/992,737, filed Mar. 28, 2008, entitled "INITIAL ACCESS CHANNEL FOR SCALABLE WIRELESS MOBILE COMMUNICATION NETWORKS", which claims the benefit of and is a National Phase Entry of International Application No. PCT/CA2006/001595, filed Sep. 28, 2006, and claims the benefit of U.S. Provisional Patent Application No. 60/759,388 filed Jan. 17, 2006, U.S. Provisional Patent Application No. 60/722,744 filed Sep. 30, 2005, and U.S. Provisional Patent Application No. 60/814,417 filed Jun. 15, 2006, which are herein incorporated by reference in their entirety as though fully and completely set forth herein.

FIELD OF THE INVENTION

The invention relates to wireless mobile communication systems, and in particular to physical layer structures and access schemes for use in such networks.

BACKGROUND

In OFDM (Orthogonal Frequency Division Multiplexing) and OFDMA (Orthogonal Frequency Division Multiple Access) wireless communication networks, data streams are typically transmitted in parallel using multiple orthogonal sub-carriers or tones within a single channel. The use of orthogonal sub-carriers allows the sub-carriers' spectra to overlap, thus achieving high spectrum efficiency. An OFDM system maps coded or modulated information symbols, QPSK (Quadrature Phase Shift Keying) or QAM (Quadrature Amplitude Modulation) symbols for instance, to sub-carriers in the frequency domain, and then generates a time domain signal for transmission using such a transformation technique as IFFT (Inverse Fast Fourier Transform). At a receiver, a time-to-frequency transformation, such as an FFT (Fast Fourier Transform), is used to convert a received time domain signal into the frequency domain. In order to recover transmitted source symbols correctly, the receiver aligns an FFT window with a corresponding IFFT window used at the transmitter and compensates for any frequency offset between the transmitter and the receiver.

Initial access to a communication network by a communication terminal involves a search operation to find available base stations and communication channels and a synchronization operation to synchronize the terminal to a base station. Dedicated physical channels, such as a downlink initial access channel (IACH) and a synchronization channel (SCH) for timing and frequency synchronization are used. A downlink IACH enables initial system access.

In wireless communication systems, the Base Transceiver Station (BTS) and User Equipment (UE) may have different transmission bandwidth capabilities. For example, a BTS and a UE may each have scalable bandwidths from 1.25 MHz to 20 MHz. However, in prior art systems, the bandwidth of the IACH is equal to the system transmission bandwidth and is thus variable depending on the system transmission bandwidth. This assumes that the UE reception capability is always equal to or larger than the transmission bandwidth. In prior art systems, a UE finds the system transmission bandwidth by changing the receive bandwidth and FFT size. This approach requires longer access time and complexity.

SUMMARY OF THE INVENTION

A downlink initial access channel is described to support different types of UE capabilities and different system bandwidths.

According to one aspect of the present invention, there is provided a method of transmitting an access channel in a network having a system bandwidth, the access channel comprising a first channel and a second channel, the method comprising transmitting the access channel using a bandwidth less than the system bandwidth.

According to another aspect of the present invention, there is provided a method of transmitting a communication signal, the communication signal comprising one or more frames being of the type that are regularly repeated, each frame comprising a plurality of time slots, each time slot comprising one or more OFDM symbols, the method comprising: inserting common pilot symbols in predetermined OFDM symbols; inserting a SCH over some or all of the predetermined OFDM symbols; transmitting the communication signal.

According to still another aspect of the present invention, there is provided a method for decoding a BCH from a diversity transmitted signal comprising: receiving a plurality of time domain OFDM signals from a plurality of transmit antennas to provide a received signal; decoding from the received signal a basic BCH without any information regarding the number of transmit antennas; and decoding from the received signal an Extended BCH.

According to yet another aspect of the present invention, there is provided a method of a UE performing initial access to a BTS comprising: performing initial timing and frequency synchronization based on a basic SCH; performing initial cell search based on the basic SCH; detecting the basic BCH; obtaining system parameters; decoding a basic BCH and an Extended BCH; entering a connected mode; and performing sync tracking and cell search based on both the basic SCH and the Extended SCH.

According to a further aspect of the present invention, there is provided a base transceiver station in a communication network, the communication network having a system bandwidth, the base transceiver station comprising: a processor configured to select a bandwidth for an access channel less than the system bandwidth, and transmit the access channel.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying diagrams, in which:

FIG. 11D is a diagram of SSC and PSC locations for a scattered pilot design;

DETAILED DESCRIPTION OF THE EMBODIMENTS

Figure 1:
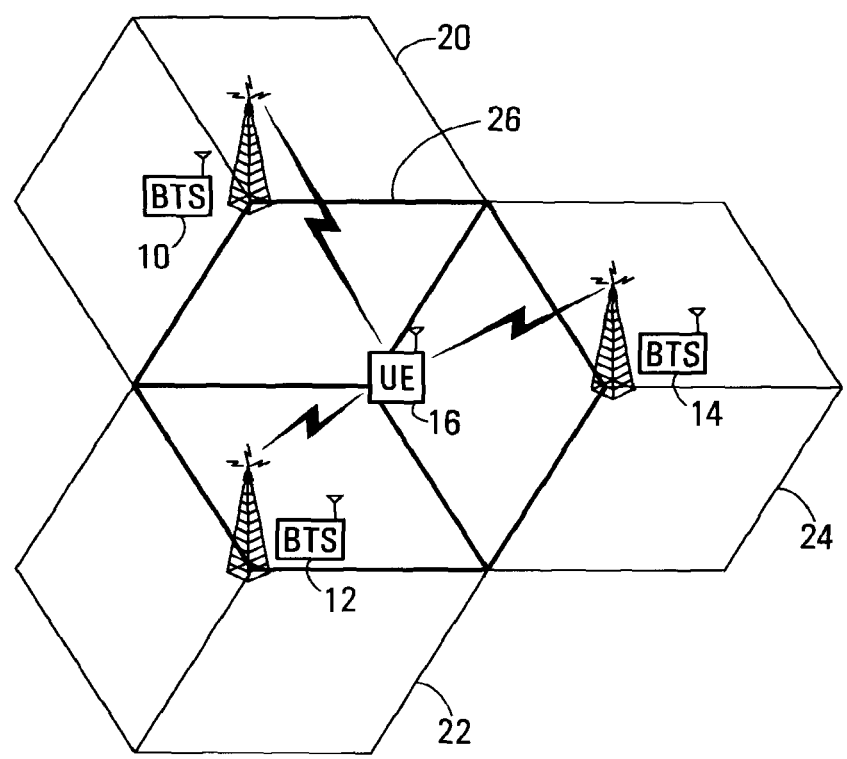
FIG. 1 is a block diagram of a wireless communication network.

FIG. 1 is a block diagram of a wireless communication network. The communication network includes BTSs 10, 12, 14, which provide communication network coverage to respective coverage areas or "cells" 20, 22, 24. UE 16 is adapted to communicate with any of the BTSs 10, 12, 14 within whose coverage areas the UE 16 is located.

The communication network shown in FIG. 1 is intended solely for illustrative purposes, and that a communication network may include further or different components than those explicitly shown in FIG. 1. For example, most communication networks include more than three BTSs and provide communication services for many UEs. Such communication networks are also normally connected to other types of networks, including landline telephone networks, for instance. It should be further appreciated that BTS coverage areas and UE ranges are not normally purely hexagonal, and will include other areas of overlap.

Each BTS 10, 12, 14 includes a transceiver, or alternatively a separate transmitter and receiver, for sending communication signals to and receiving communication signals from the UE 16 via an antenna system. An antenna system at a BTS may include a single antenna or a multiple antennas, such as in an antenna array, for example. The BTSs 10, 12, 14 may also communicate with each other, and with other communication stations or components, including components in other communication networks, through wireless or wired communication links. Communication functions of the BTSs may involve such operations as modulation and demodulation, coding and decoding, filtering, amplification, and frequency conversion. These and possibly other signal processing operations are preferably performed in the BTSs by digital signal processors (DSPs) or general-purpose processors that execute signal processing software.

UE 16 is a wireless communication device such as a data communication device, a voice communication device, a multiple-mode communication device that supports data, voice, and possibly further communication functions, or a wireless modem that operates in accordance with a computer system. UE 16 receives communication signals from and/or sends communication signals to the BTSs 10, 12, 14 through a transceiver or a receiver and a transmitter, and an antenna system that may include a single antenna or multiple antennas. As in the BTSs 10, 12, 14, such signal processing operations as modulation and demodulation, coding and decoding, filtering, amplification, and frequency conversion may be performed by a DSP or general-purpose processor in UE 16.

Communication signals between BTSs and UEs in a communication network are formatted according to a particular protocol or communication scheme for which the communication network is adapted. Such signal formats are also commonly referred to as physical layer structures.

An IACH is an initial acquisition channel for a mobile terminal such as UE 16 of FIG. 1 to access a communication network. For example, when UE 16 is turned on, the device first receives the IACH transmitted from a BTS such as BTS 10. The IACH is used for one or more functions including initial access, synchronization, base station identification, and channel estimation. More particularly, an IACH comprises control information and includes an SCH and a BCH. An IACH can also be used for the synchronization tracking and cell search for UEs in the connected mode and idle mode.

Figure 2:
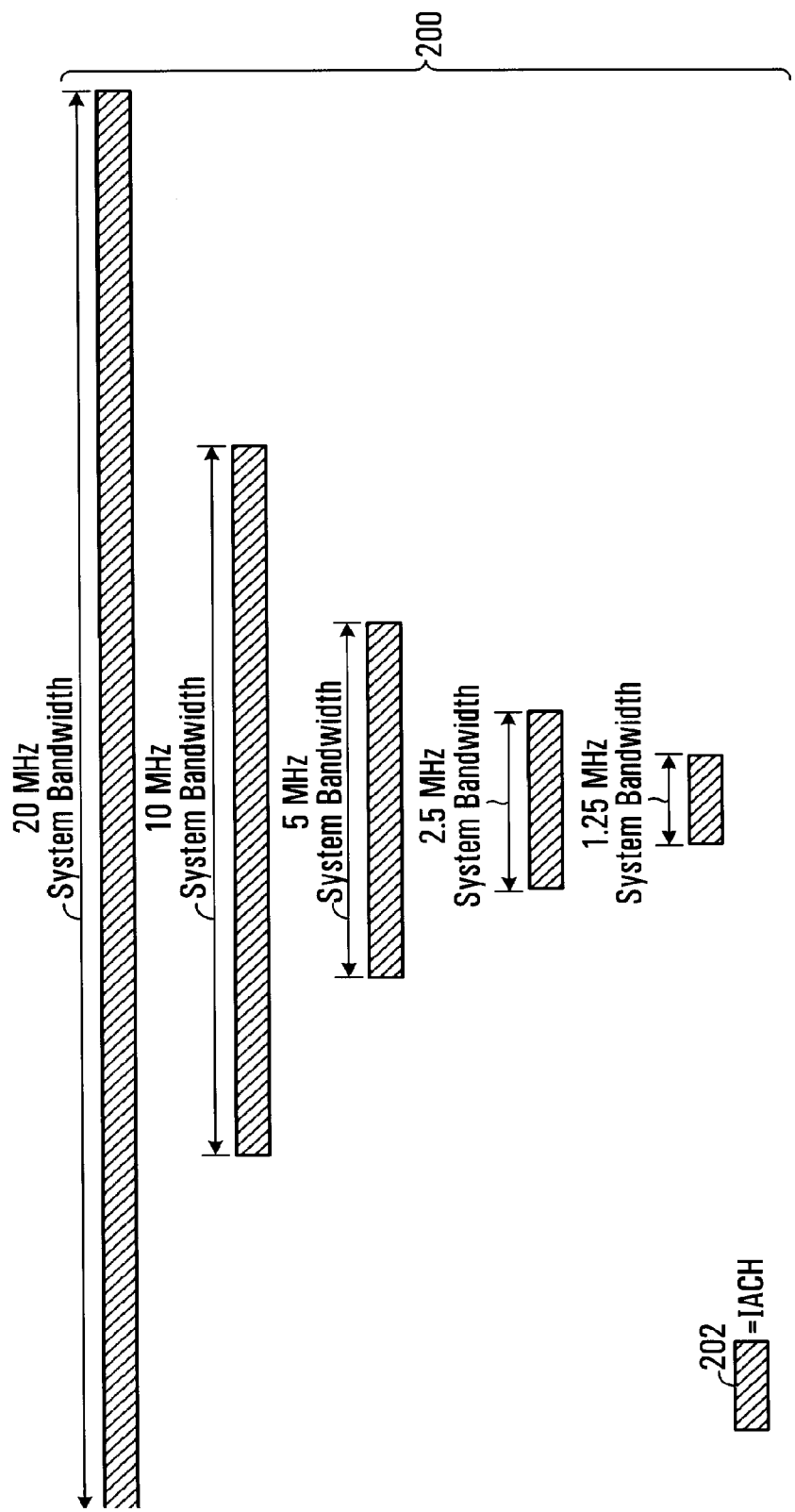
FIG. 2 is a diagram of a known physical layer structure for a wireless communication network.

FIG. 2 illustrates prior art system bandwidths structure 200 for a wireless communication network in the frequency domain in an OFDMA network where system bandwidths are scalable from 1.25 MHz, 2.5 MHz, 5 MHz, 10 MHz and 20 MHz generally indicated at 200. Also illustrated at 202 is the bandwidth of the IACH which is equal to the system bandwidth for each of the 1.25 MHz, 2.5 MHz, 5 MHz, 10 MHz and 20 MHz scenarios.

Spectral efficiencies can be gained where the IACH is designed to have a bandwidth less than the system bandwidth for at least some system bandwidths. Fast initial access can be supported by reduce the blind bandwidth search time with reasonable overhead.

The Spectrum Arrangement of a Synchronization Channel (SCH) and an Extended Synchronization Channel (Extended SCH)

An SCH is a logical channel used by mobile stations to achieve time/frequency synchronization with the network. An SCH enables (i) fast initial system access; (ii) timing and frequency synchronization and tracking, (iii) fast cell selection and re-selection; (iv) low complexity; (v) Downlink (DL) Continuous Quality Indicator (CQI) measurement; and (vi) channel estimation.

An SCH is typically comprised of two channels, a Primary Synchronization Channel (PSC) and a Secondary Synchronization Channel (SSC). The synchronization process occurs when a UE is initially turned on and also thereafter when the UE moves from one cell to another. Synchronization is required because the UE does not previously have a set timing with respect to the BTS. The PSC is detected in a first acquisition stage, which provides the UE of the timing of the communications. The SSC is detected at a later acquisition stage, which provides the UE with more accurate timing information and a cell id.

The PSC may be modulated with the Primary Sync Sequences (PSS). The same Pseudo-noise (PN) sequences across the whole network enable fast system access and cell search.

An Extended SCH is used to improve ongoing cell search performance.

Figure 3A:
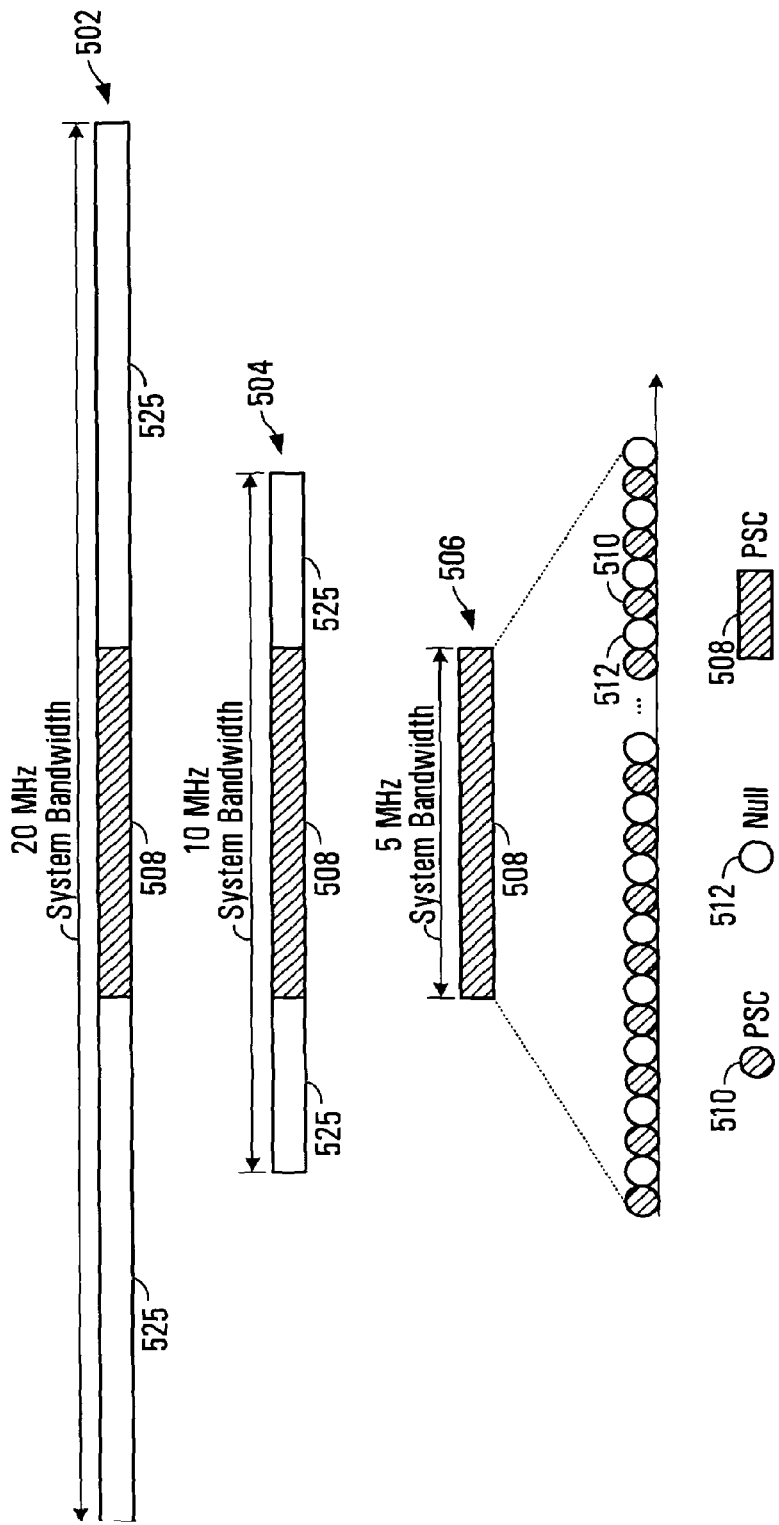
FIG. 3A is a diagram illustrating spectrum allocation for a Primary common Synchronization Channel (PSC) for 5 MHz, 10 MHz and 20 MHz transmission bandwidths.
Figure 3B:
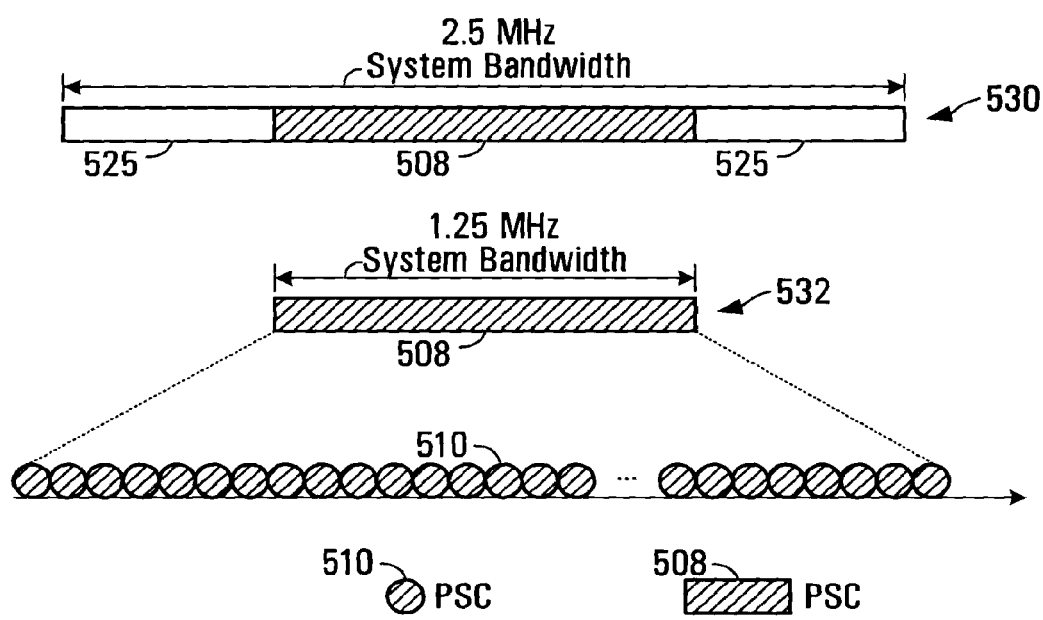
FIG. 3B is a diagram illustrating spectrum allocation for a PSC for 1.25 MHz, and 2.5 MHz transmission bandwidths.

A first implementation of the invention is shown in FIGS. 3A and 3B which illustrate two types of SCH (i) Type 1 in FIG. 3A, for system bandwidths equal to or above 5 MHz, and (ii) Type 2 in FIG. 3B, for system bandwidths below 5 MHz. As illustrated, the SCH bandwidth (as represented by PSC 508) is less than the system bandwidth where system bandwidth equals 20 MHz, 10 MHz and 2.5 MHz). In the cases of 5 MHz and 1.25 MHz, the SCH bandwidth equals the system bandwidth. This allows for fast blind initial access by a UE.

BTS bandwidth information can be conveyed by the PSC for Type 1 and Type 2. For Type 1: Three common PN sequences corresponding to three possible system bandwidths: 5 MHz, 10 MHz and 20 MHz and (ii) Type 2: Two common PN sequences corresponding to two possible system bandwidths: 1.25 MHz and 2.5 MHz. The time domain repetition structure of PSC symbol(s) allows the fast coarse synchronization. In Type 1, only half of the sub-carriers are modulated (see bottom portion of FIG. 3A). In Type 2, there may be two identical PSC symbols (see bottom portion of FIG. 3B).

As shown in FIG. 3A, for Type 1, the PSC 508 is located in 5 MHz in the center of the available band. In the case of 20 MHz system bandwidth 502, PSC 508 takes up only 5 MHz of bandwidth, leaving 15 MHz of leftover bandwidth 525. In the case of 10 MHz system bandwidth 504, PSC 508 takes up only 5 MHz of bandwidth, leaving 5 MHz of leftover bandwidth 525. In the case of 5 MHz system bandwidth 502, PSC 508 takes up all 5 MHz of bandwidth, leaving no leftover bandwidth. As illustrated in this Type 1 system, PSC 510 is modulated on half of the sub-carriers, leaving the other half of the sub-carriers to be null 512. The spectrum allocation displayed in FIG. 3A for various system bandwidths is merely illustrative of one example of this embodiment.

As shown in FIG. 3B, for Type 2, the primary common SCH is located in 1.25 MHz in the center of the available band. In the case of 2.5 MHz system bandwidth 530, PSC 508 takes up only 1.25 MHz of bandwidth, leaving 1.25 MHz of leftover bandwidth 525. In the case of 1.25 MHz system bandwidth 532, PSC 508 takes up all 1.25 MHz of bandwidth, leaving no leftover bandwidth. As illustrated in this Type 2 system, PSC 510 is modulated on all of the useful sub-carriers. The spectrum allocation displayed in FIG. 3B for various system bandwidths is merely illustrative of one example of this embodiment.

A further embodiment of the invention is now described. The basic sampling frequency (fs) and FFT size (Nfft) can be defined according to the basic SCH bandwidth, which is chosen based on a trade-off of IACH detection performance and UE minimum implementation complexity as well as UE reception capability. The actual occupied bandwidth of the basic SC is determined by the basic SCH bandwidth, for example, around 4.5 MHz for 5 MHz of basic SCH bandwidth.

Improved performance may be obtained from multiple basic SCHs when the system bandwidth and UE capacity is multiple times of the basic SCH bandwidth. Note that guard bands are used between basic IACHs to allow IACH acceptance by a UE with narrower than system bandwidth capacity.

Common sequence or sequences are transmitted by the PSC. All cells (or sectors) transmit the same sequence or the selected sequence from the same sequence set.

Figure 4:
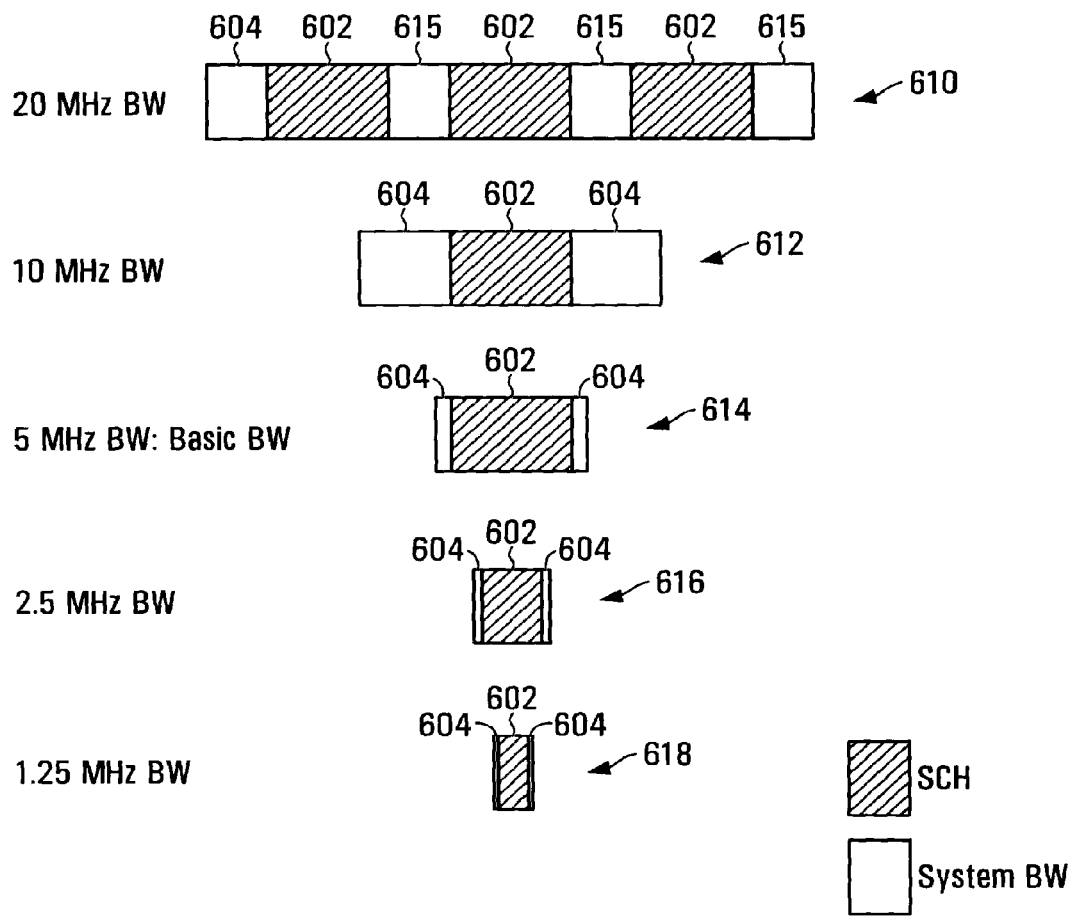
FIG. 4 is a diagram illustrating various examples of SCH spectrum allocations for 1.25 MHz, 2.5 MHz, 5 MHz, 10 MHz and 20 MHz transmission bandwidths.

FIG. 4 is a diagram illustrating various examples of frequency domain IACH structures. In the case of 20 MHz system bandwidth 610, SCH 602 is shown taking up intervals of approximately 4.5 MHz of bandwidth between guard bands 615. As noted above, improved performance may be obtained from multiple basic SCHs when the system bandwidth and UE capacity is multiple times of the basic SCH bandwidth.

In the 10 MHz bandwidth case 612, SCH 602 takes up approximately 4.5 MHz leaving approximately 5.5 MHz of leftover system bandwidth 604. In the case of 5 MHz system bandwidth 614, SCH 602 takes up approximately 4.5 MHz leaving approximately 1 MHz of leftover system bandwidth 604. In the case of 2.5 MHz system bandwidth 616, SCH 602 takes up approximately 2 MHz leaving approximately 0.5 MHz of leftover system bandwidth 604. In the case of 1.25 MHz bandwidth 618, SCH 602 takes up approximately 1 MHz leaving approximately 0.25 MHz of leftover system bandwidth 604. The spectrum allocation displayed in FIG. 4 for various system bandwidths is merely illustrative of one example of this embodiment. The values of 4.5, 2 MHz and 1 MHz are only examples, the exact values are determined by the specific implementation.

Figure 5A:
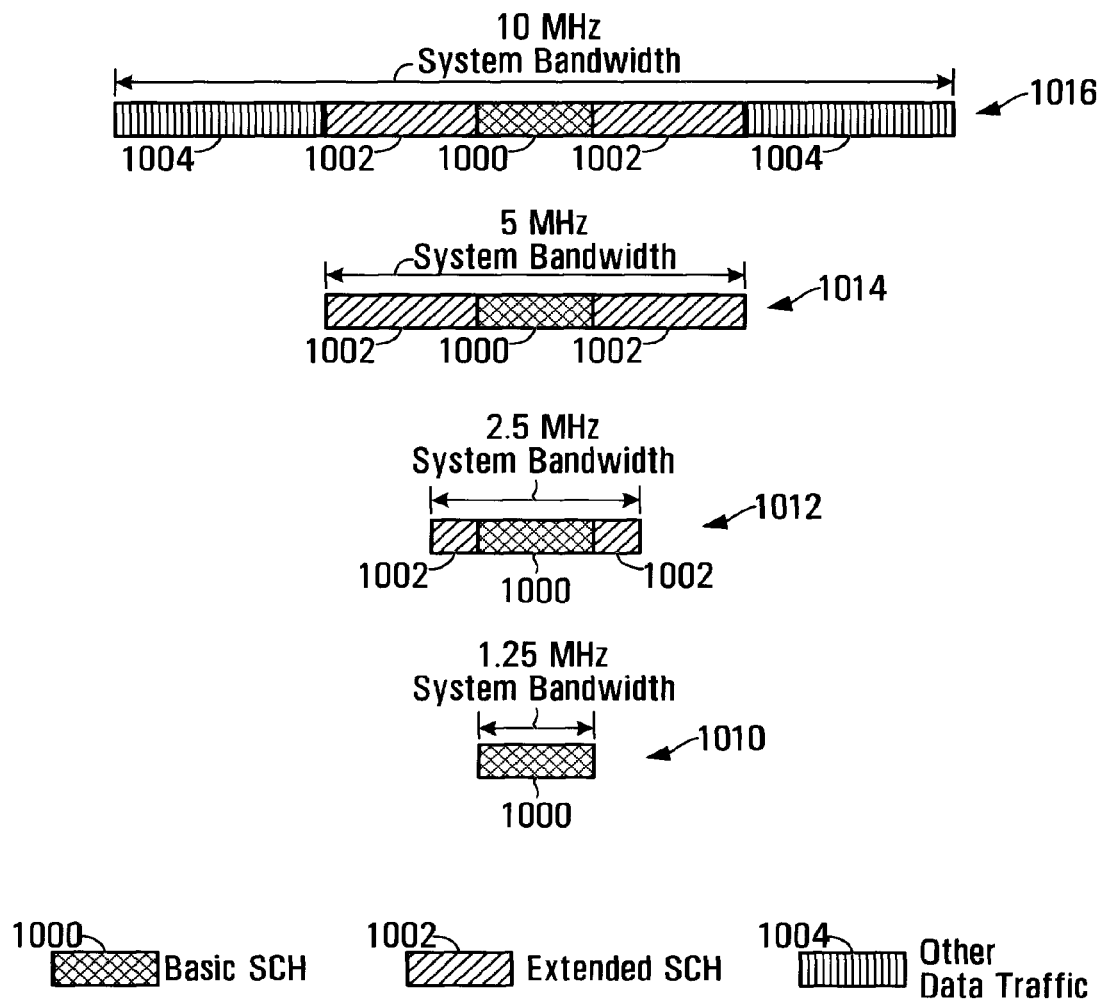
FIG. 5A is a diagram illustrating various examples of SCH and Extended SCH spectrum allocations for 1.25 MHz, 2.5 MHz, 5 MHz, and 10 MHz transmission bandwidths.

FIG. 5A is a diagram illustrating the spectrum allocation of a basic SCH 1000 and an Extended SCH 1002. During initial access, a UE has no information about the transmission bandwidth. To simplify the initial cell search, a basic SCH 1000 of fixed narrow bandwidth, for example 1.25 MHz, is used regardless of the overall transmission bandwidth. This basic SCH 1000 of fixed narrow bandwidth (in this case, 1.25 MHz) is shown in connection with the case of 1.25 MHz system bandwidth 1010, 2.5 MHz system bandwidth 1012, 5 MHz system bandwidth 1014, and 10 MHz system bandwidth 1016.

To support mobility, a UE still needs to perform the cell search after initial access. At this stage, the UE already knows the transmission bandwidth of the serving BTS and even the neighbouring BTS through the broadcast-control channel.

All useful sub-carriers in an SCH symbol are shared by the SCH and other data transmission. The basic SCH occupies the central 75 sub-carriers which in this example represents 1.25 MHz of bandwidth. For >1.25 MHz transmission bandwidth scenarios, the leftover spectrum could be occupied by an Extended SCH and other data transmissions, depending on the overall SCH bandwidth and the overall transmission bandwidth. In the case where the Extended SCH does not occupy all of the leftover spectrum, other traffic, for example broadcast-control information, can also be transmitted by the same SCH symbol.

Accordingly, an Extended SCH 1002 can be defined to enhance the cell search performance in the connected mode and idle mode. The whole SCH will therefore consist of two parts: (i) basic SCH 1000 used for initial access and occupied 1.25 MHz bandwidth, and (ii) Extended SCH 1002 which is used to enhance the cell search performance.

The same SCH sequence with certain repetition or different SCH sequence can be used by Extended SCH 1002. The advantage of this approach is low SCH overhead, especially when SCH is transmitted multiple times in each frame.

In the case of 1.25 MHz system bandwidth 1010, Extended SCH 1002 occupies 0 MHz of bandwidth as basic SCH 1000 has occupied the entirety of the spectrum. In the case of 2.5 MHz system bandwidth 1012, Extended SCH 1002 occupies 1.25 MHz of system bandwidth. In the case of 5 MHz system bandwidth 1014, Extended SCH 1002 occupies 3.75 MHz of bandwidth. In the case of 10 MHz system bandwidth 1016, Extended SCH 1002 occupies 3.75 MHz of bandwidth. Other data traffic 1004 occupies 5 MHz of bandwidth. The spectrum allocation displayed in FIG. 5A for various system bandwidths is merely illustrative of one example of this embodiment.

In another embodiment, basic SCH 1000 is transmitted through the central 75 sub-carriers in each band, and the Extended SCH 1002 is transmitted by all leftover spectrums. The advantage of this solution is that the low PAPR of a SCH symbol can be achieved when the cell common or cell specific waveform is defined with as low a PAPR as possible. The average transmission power of a SCH symbol can be higher than other OFDM symbols. This improves the cell search performance in some scenario, especially in the unsynchronized networks and for large cell size. The cell search performance is improved proportionally with the increase of the overall transmission bandwidth. More SCH overhead is introduced in each SCH symbol, especially for above 5 MHz transmission bandwidth cases. To reduce SCH overhead, SCH may be transmitted less frequently in each frame. The basic SCH sequence should be the central portion of the overall SCH sequence which has a low PAPR. The length of the total SCH sequence is equal to the overall length of basic SCH 1000 and the Extended SCH 1002.

Figure 5B:
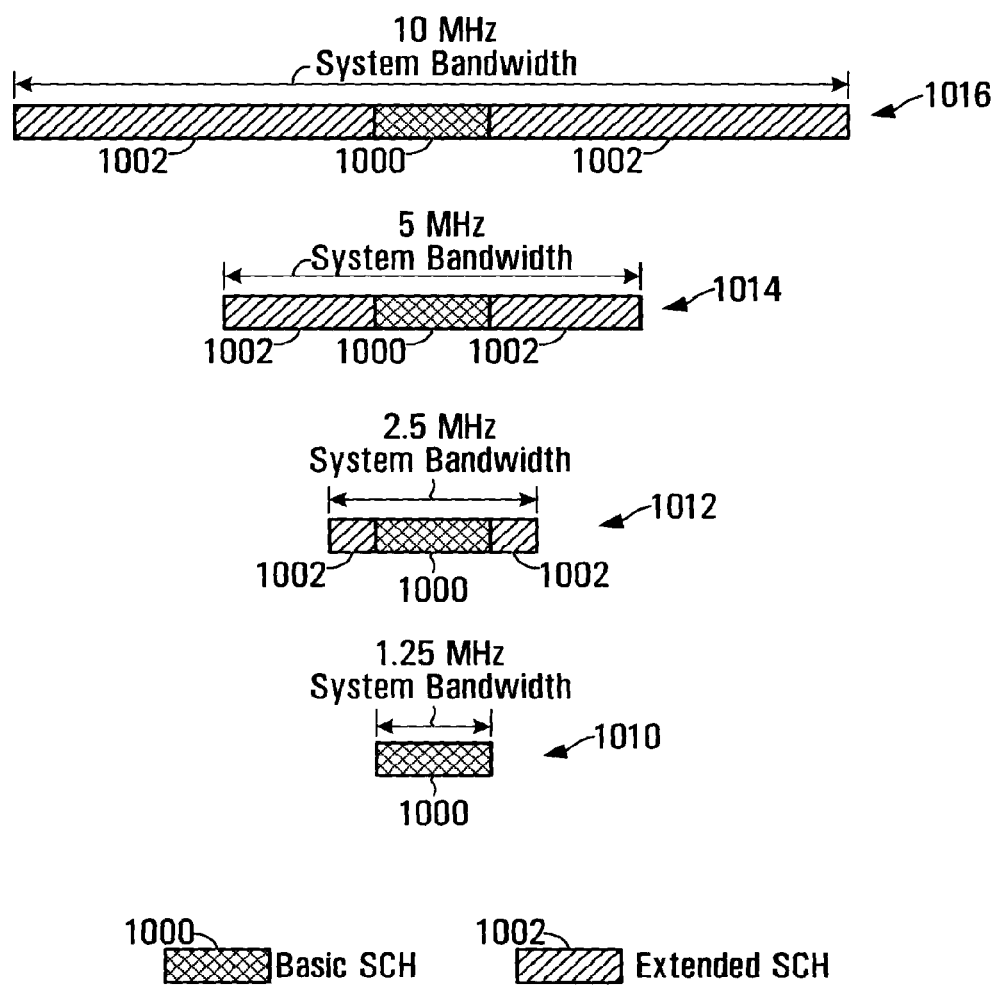
FIG. 5B is a diagram illustrating other examples of SCH and Extended SCH spectrum allocations for 1.25 MHz, 2.5 MHz, 5 MHz, and 10 MHz transmission bandwidths.

FIG. 5B is a diagram illustrating the spectrum allocation of basic SCH 1000 and Extended SCH 1002 in this alternative embodiment. In the case of 1.25 MHz system bandwidth 1010, Extended SCH 1002 occupies 0 MHz of bandwidth as basic SCH 1000 has occupied the entirety of the spectrum. In the case of 2.5 MHz system bandwidth 1012, basic SCH 1000 occupies 1.25 MHz of bandwidth with Extended SCH 1002 occupying the remainder, or 1.25 MHz of system bandwidth. In the case of 5 MHz system bandwidth 1014, basic SCH 1000 occupies 1.25 MHz of bandwidth, with Extended SCH 1002 occupying the remainder, or 3.75 MHz of bandwidth. In the case of 10 MHz system bandwidth 1016, basic SCH 1000 occupies 1.25 MHz of bandwidth, with Extended SCH 1002 occupying the remainder, or 8.75 MHz of bandwidth. In this case, Extended SCH 1002 is transmitted by all leftover spectrums and therefore there is no leftover bandwidth for other data traffic as there was in connection with the embodiment shown in FIG. 5A. The spectrum allocation displayed in FIG. 5B for various system bandwidths is merely illustrative of one example of this embodiment of the invention.

In another embodiment, a maximum SCH bandwidth, which is the total SCH bandwidth including the basic SCH and the Extended SCH, for example 5 MHz, is defined. In this embodiment, if the overall spectrum is broader than the maximum SCH bandwidth, the unoccupied spectrum will not be used.

Figure 5C:
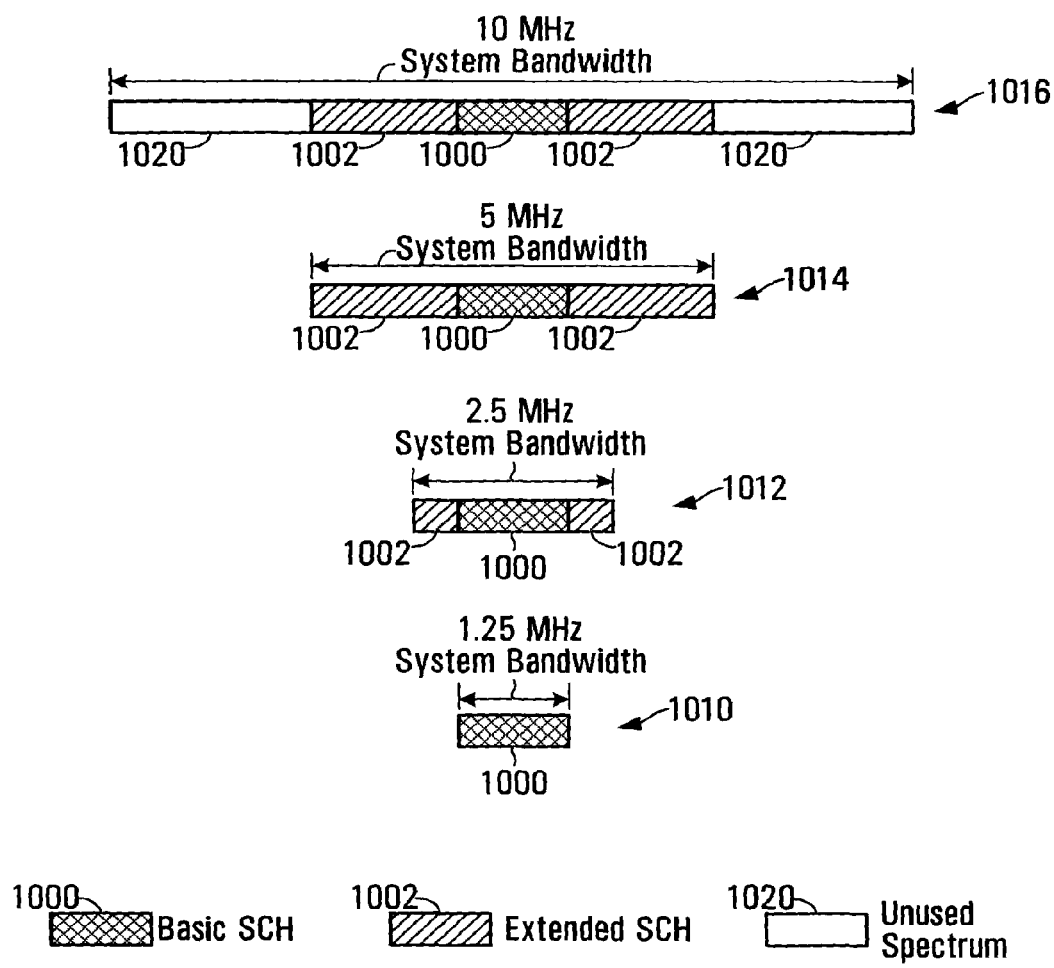
FIG. 5C is a diagram illustrating yet other examples of SCH and Extended SCH spectrum allocations for 1.25 MHz, 2.5 MHz, 5 MHz, and 10 MHz transmission bandwidths.

FIG. 5C is a diagram illustrating the spectrum allocation of a basic SCH 1000 and an Extended SCH 1002 in this alternative embodiment. In the case of 1.25 MHz system bandwidth 1010, Extended SCH 1002 occupies 0 MHz of bandwidth as basic SCH 1000 has occupied the entirety of the spectrum. In the case of 2.5 MHz system bandwidth 1012, basic SCH 1000 occupies 1.25 MHz of bandwidth with Extended SCH 1002 occupying the remainder, or 1.25 MHz of system bandwidth. In the case of 5 MHz system bandwidth 1014, basic SCH 1000 occupies 1.25 MHz of bandwidth, with Extended SCH 1002 occupying the remainder, or 3.75 MHz of bandwidth. In the case of 10 MHz system bandwidth 1016, basic SCH 1000 occupies 1.25 MHz of bandwidth, with Extended SCH 1002 occupying 3.75 MHz of bandwidth. In this case, leftover bandwidth 1020 is left unused. The spectrum allocation displayed in FIG. 5C for various system bandwidths is merely illustrative of one example of this embodiment of the invention.

In another embodiment, three options for SCH bandwidth and location for 20 MHz transmission bandwidth are described. It is currently assumed by persons skilled in the art that the maximum downlink transmission bandwidth is 20 MHz. However the maximum UE reception capability is 10 MHz. It is expected that a UE with 10 MHz reception capability will operate in either the lower part of upper part of the full 20 MHz transmission band. To avoid inter-frequency measurement during a neighbour-cell measurement, it is desired that cell search be performed by a UE without re-tuning the centre carrier frequency in connected mode and idle mode.

Figure 6A:
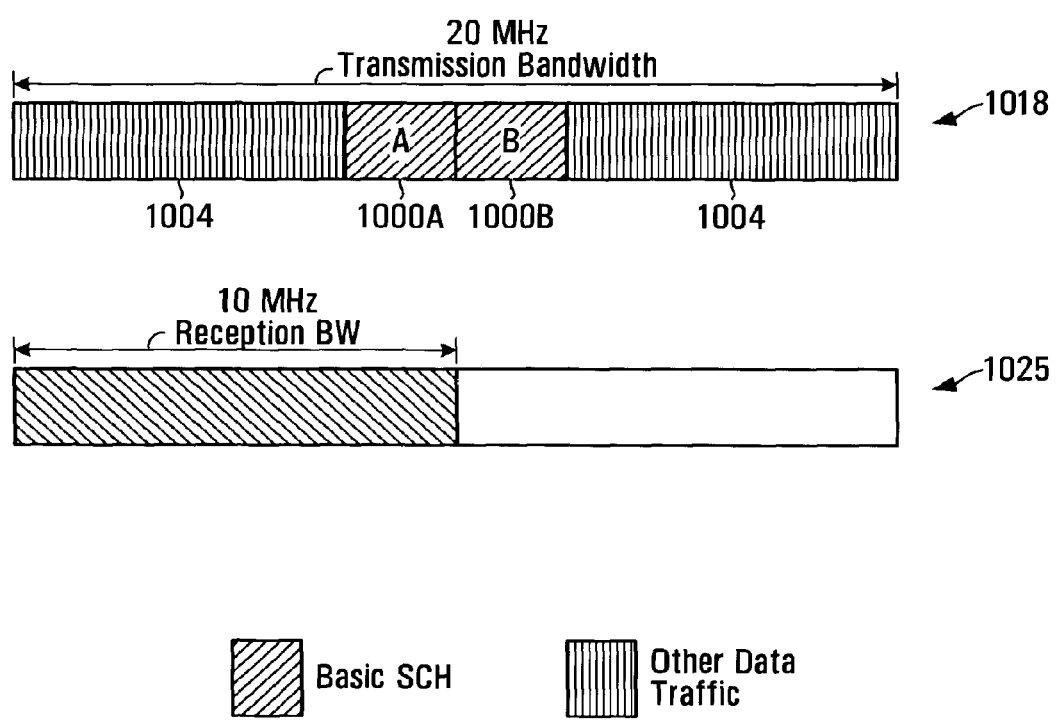
FIG. 6A is a diagram illustrating a first example for spectrum allocation for a SCH for 20 MHz transmission bandwidth.

The first option for this embodiment is shown in FIG. 6A. In this embodiment, two identical SCHs, SCH A 1000A and SCH B 1000B are transmitted in the lower band and the upper band of a 20 MHz system bandwidth spectrum 1018 separately. For the sake of clarity, SCH A 1000A and SCH B 1000B are both being represented by SCH 1000 in the same shading. Other data traffic 1004 occupies the remainder of the spectrum in both the upper band and lower band. In the lower half of FIG. 6A, a 10 MHz reception bandwidth 1025 for a UE is shown. The spectrum allocation displayed in FIG. 6A for various system bandwidths is merely illustrative of one example of this embodiment of the invention.

Figure 6B:
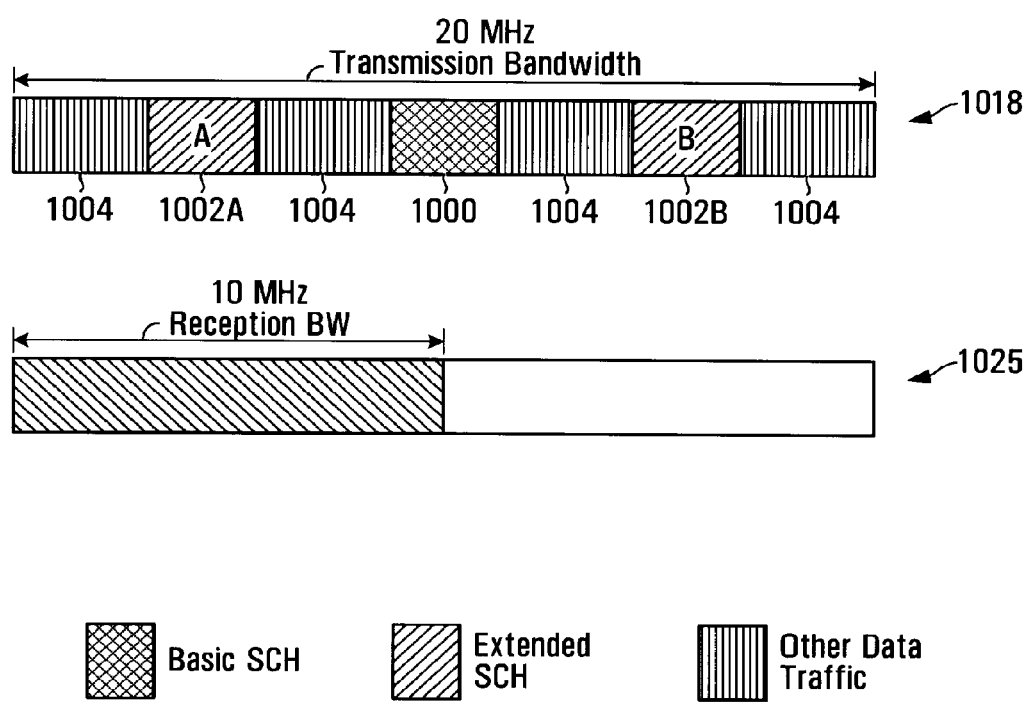
FIG. 6B is a diagram illustrating a second example for spectrum allocation for a SCH for 20 MHz transmission bandwidth.

A second option for this embodiment is shown in FIG. 6B. In this embodiment, a basic SCH 1000 is transmitted at the center of the 20 MHz system bandwidth spectrum 1018. Two Extended SCHs, Extended SCH A 1002A and Extended SCH B 1002B are transmitted in the lower band and upper band separately though in different positions than as was shown in FIG. 6A. Other data traffic 1004 occupies the remainder of the spectrum in both the upper band and lower band. In the lower half of FIG. 6B, a 10 MHz reception bandwidth 1025 for a UE is shown. For the sake of clarity, Extended SCH A 1002A and Extended SCH B 1002B are both being represented by SCH 1000 in the same shading. The spectrum allocation displayed in FIG. 6B for various system bandwidths is merely illustrative of one example of this embodiment. For example, basic SCH 1000 and Extended SCH 1002A, 1002B could be transmitted alternatively in time.

The Spectrum Arrangement of a Broadcast-Control Channel (BCH) and an Extended Broadcast-Control Channel (Extended Broadcast-Control Channel)

A BCH is a downlink channel including specific parameters needed by a UE in order that it can identify the network and gain access to it. Typical information includes the Location Area Code (LAC), Routing Area Code (RAC), and the Mobile Network Code (MNC), and other system parameters.

A BCH can be located at any predetermined location in each frame. The overall BCH includes a basic BCH and an Extended BCH. A basic BCH is used to transmit the information to a UE with at least the same bandwidth capabilities as the minimum bandwidth supported by each type. The basic BCH transmits important system parameters, including antenna configuration, overall transmission bandwidth, the bandwidth of the Extended SCH, the bandwidth of the Extended BCH, and the cyclic prefix length. An Extended BCH transmits other broadcast-control signaling including the information for the UE above the available system bandwidth capabilities.

The frequency domain arrangement of BCH is described as follows. The basic BCH originates at the left end of the spectrum. The Extended BCH occupies the leftover available spectrum. Guard bands may be required between the basic BCH and Extended BCH as well as between the Extended BCHs.

Figure 7:
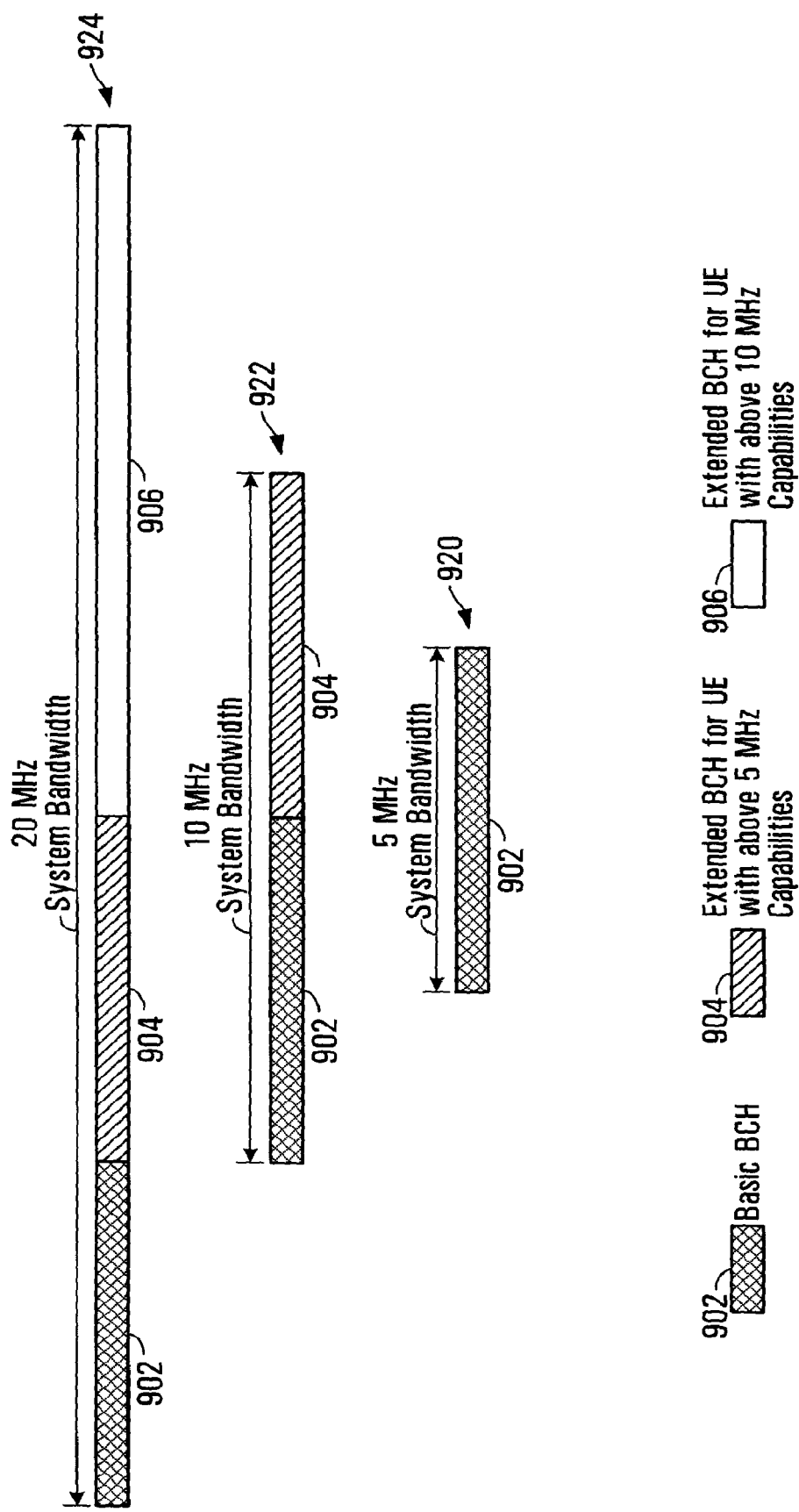
FIG. 7 is a diagram of the frequency domain structure of the broadcast-control channel (BCH) for system bandwidths of 5 MHz, 10 MHz and 20 MHz.

FIG. 7 is a diagram of the frequency domain structure of the BCH in this embodiment for system bandwidths from 5 MHz to 20 MHz. In the case of 5 MHz system bandwidth 920, basic BCH 902 takes up all of the available system bandwidth. In the case of 10 MHz system bandwidth 922, basic BCH 902 takes up 5 MHz of bandwidth, and Extended BCH 904 takes up the remainder of the system bandwidth. Extended BCH 904 is designed to be used for a UE with receive capabilities over 5 MHz. In the case of a 20 MHz system bandwidth 924, basic BCH 902 takes up 5 MHz of bandwidth, and Extended BCH 904 takes up an additional 5 MHz of system bandwidth. Extended BCH 906 is available to be used for the remainder of the system bandwidth. Extended BCH 906 is used for UE with receiving capabilities over 10 MHz. The spectrum allocation displayed in FIG. 7 for various system bandwidths is merely illustrative of one example of this embodiment.

Figure 8:
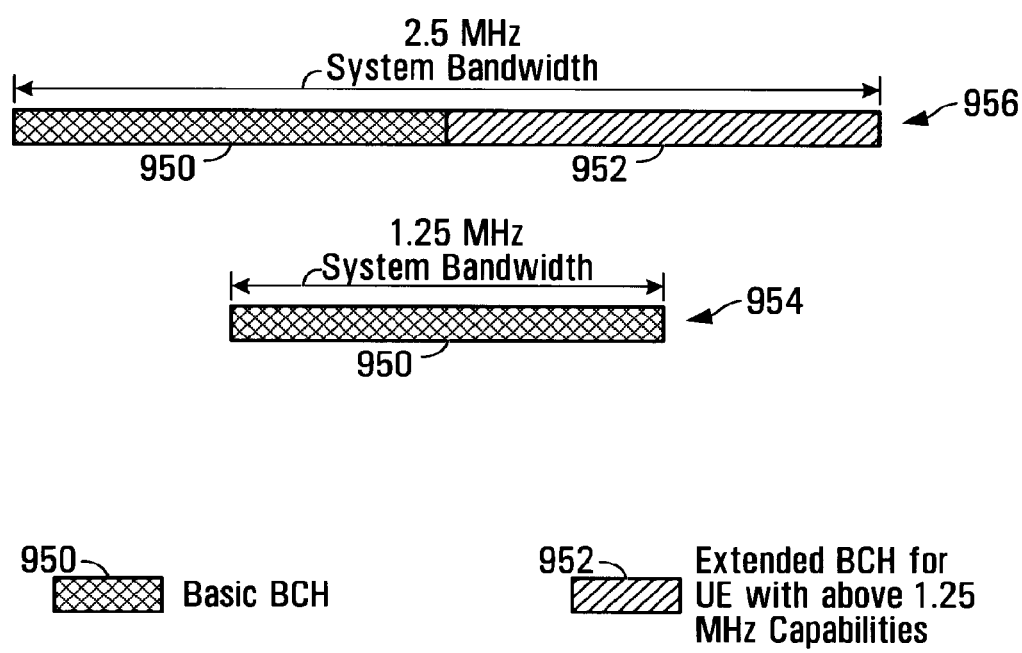
FIG. 8 is a diagram of the frequency domain structure of the BCH for system bandwidths of 1.25 MHz and 2.5 MHz.

FIG. 8 is a diagram of the frequency domain structure of the BCH in this embodiment for system bandwidths of 1.25 MHz and 2.5 MHz bandwidth. In the case of 1.25 MHz system bandwidth 954, basic BCH 950 takes up all of the available 1.25 MHz of bandwidth. In the case of 2.5 MHz system bandwidth 956, basic BCH 950 takes up 1.25 MHz of bandwidth, and Extended BCH 952 takes up an additional 1.25 MHz of system bandwidth. The spectrum allocation displayed in FIG. 8 for various system bandwidths is merely illustrative of one example of this embodiment.

Figure 9A:
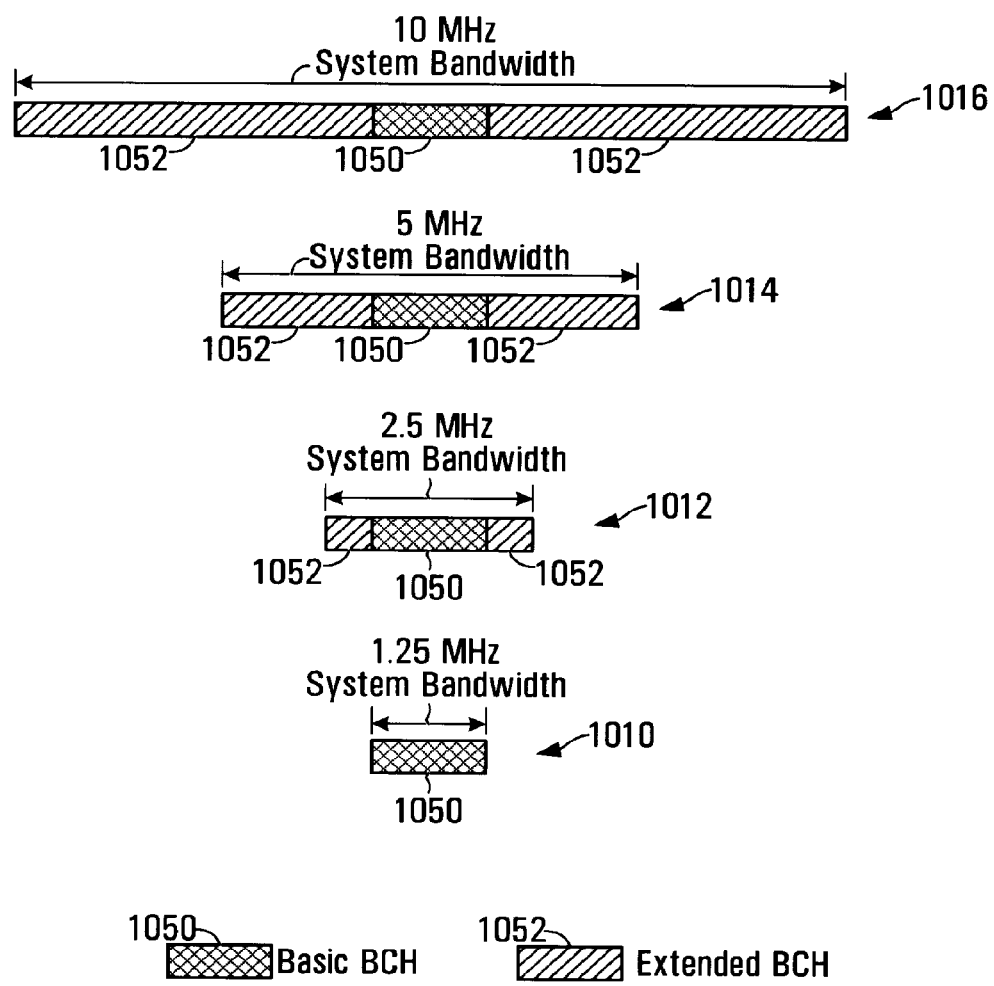
FIG. 9A is a diagram illustrating various examples of BCH and Extended BCH spectrum allocations for 1.25 MHz, 2.5 MHz, 5 MHz, and 10 MHz transmission bandwidths.

In FIG. 9A, one example of a spectrum arrangement for a BCH (i.e. basic BCH 1050 and an Extended BCH 1052) is shown. The bandwidth of the Extended BCH will vary depending on the overall system transmission bandwidth. The BCH bandwidth will increase with greater transmission bandwidth.

In the case of 1.25 MHz system bandwidth 1010, Extended BCH 1052 occupies 0 MHz of bandwidth as basic BCH 1050 has occupied the entirety of the spectrum. In the case of 2.5 MHz system bandwidth 1012, basic BCH occupies 1.25 MHz of bandwidth with Extended BCH 1052 occupying the remainder, or 1.25 MHz of system bandwidth. In the case of 5 MHz system bandwidth 1014, basic SCH 1050 occupies 1.25 MHz of bandwidth, with Extended BCH 1052 occupying the remainder, or 3.75 MHz of bandwidth. In the case of 10 MHz system bandwidth 1016, basic BCH 1050 occupies 1.25 MHz of bandwidth, with Extended BCH 1052 occupying the remainder, or 8.75 MHz of bandwidth. In this case, Extended BCH is transmitted by all leftover spectrums and therefore there is no leftover bandwidth for other traffic. The spectrum allocation displayed in FIG. 9A for various system bandwidths is merely illustrative of one example of this embodiment of the invention.

In another example of this embodiment, all useful subcarriers in a BCH symbol are shared by the broadcast-control channel and other data transmission. Therefore, a maximum BCH bandwidth is defined, which is the total BCH bandwidth (for example 5 MHz) including the basic BCH and the Extended BCH. In this example of 5 MHz BCH bandwidth, each BCH occupies the central 75 subcarriers. For >1.25 MHz transmission bandwidth scenarios the leftover spectrum could be occupied by Extended BCH and other data transmission, depending on the overall BCH bandwidth and the overall transmission bandwidth.

Figure 9B:
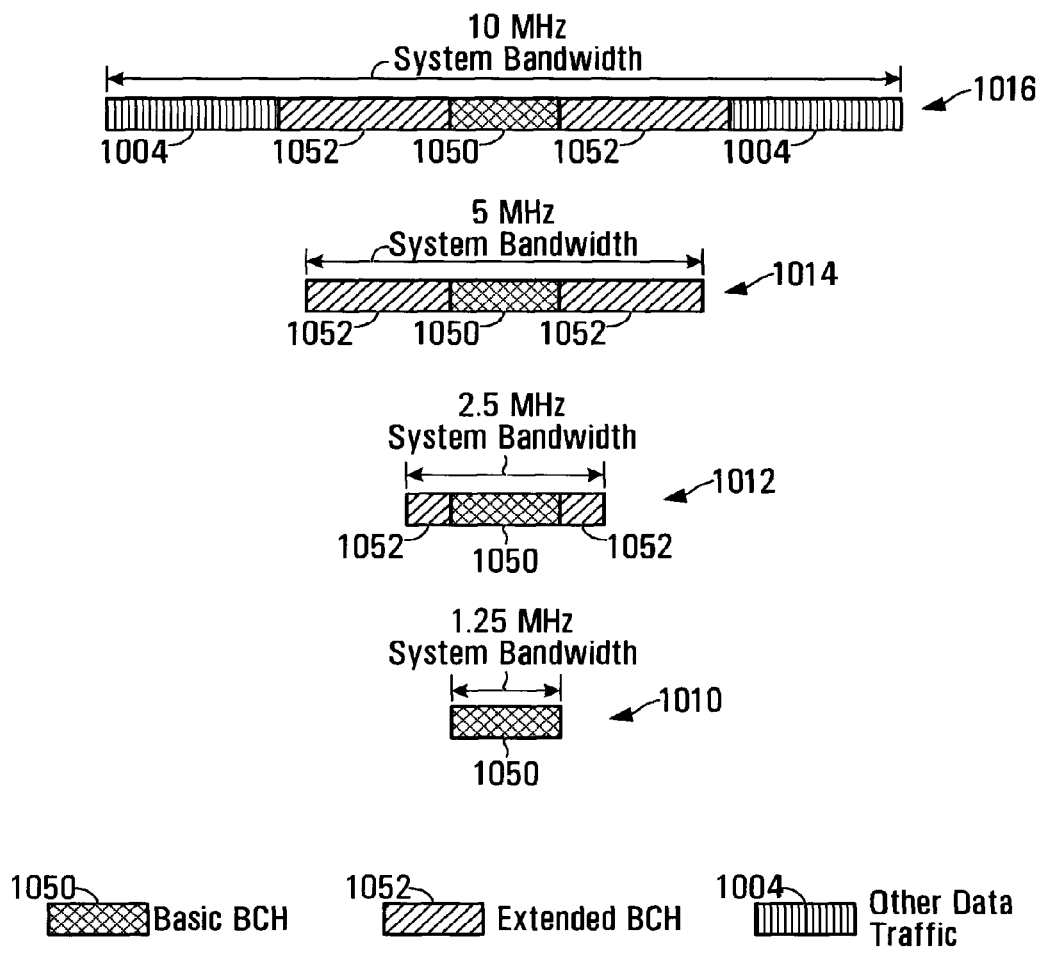
FIG. 9B is a diagram illustrating other examples of BCH and Extended BCH spectrum allocations for 1.25 MHz, 2.5 MHz, 5 MHz, and 10 MHz transmission bandwidths.

FIG. 9B is a diagram illustrating the spectrum allocation of a basic BCH 1050 and an Extended BCH 1052 in this alternate example. In the case of 1.25 MHz system bandwidth 1010, Extended BCH 1052 occupies 0 MHz of bandwidth as basic BCH 1050 has occupied the entirety of the spectrum. In the case of 2.5 MHz system bandwidth 1012, basic BCH 1050 occupies 1.25 MHz of bandwidth with Extended SCH 1052 occupying the remainder, or 1.25 MHz of system bandwidth. In the case of 5 MHz system bandwidth 1014, basic BCH 1050 occupies 1.25 MHz of bandwidth, with Extended BCH 1052 occupying the remainder, or 3.75 MHz of bandwidth. In the case of 10 MHz system bandwidth 1016, basic BCH 1050 occupies 1.25 MHz of bandwidth, with Extended BCH 1052 occupying 3.75 MHz of bandwidth. In this case, any leftover bandwidth is occupied by other data traffic 1004. The spectrum allocation displayed in FIG. 9B for various system bandwidths is merely illustrative of one example of this embodiment of the invention.

In another example, BCH bandwidth and location for 20 MHz transmission bandwidth is described. To allow a 10 MHz capability UE to detect a BCH when directed at either side of the overall 20 MHz transmission band without a change of the carrier frequency, a BCH should be transmitted twice: once in the lower 10 MHz band and once upper 10 MHz band. Both the basic BCH and the Extended BCH are transmitted in the two 10 MHz bands. The same maximum BCH bandwidth can be used as in other transmission bandwidth scenarios described above.

Figure 10:
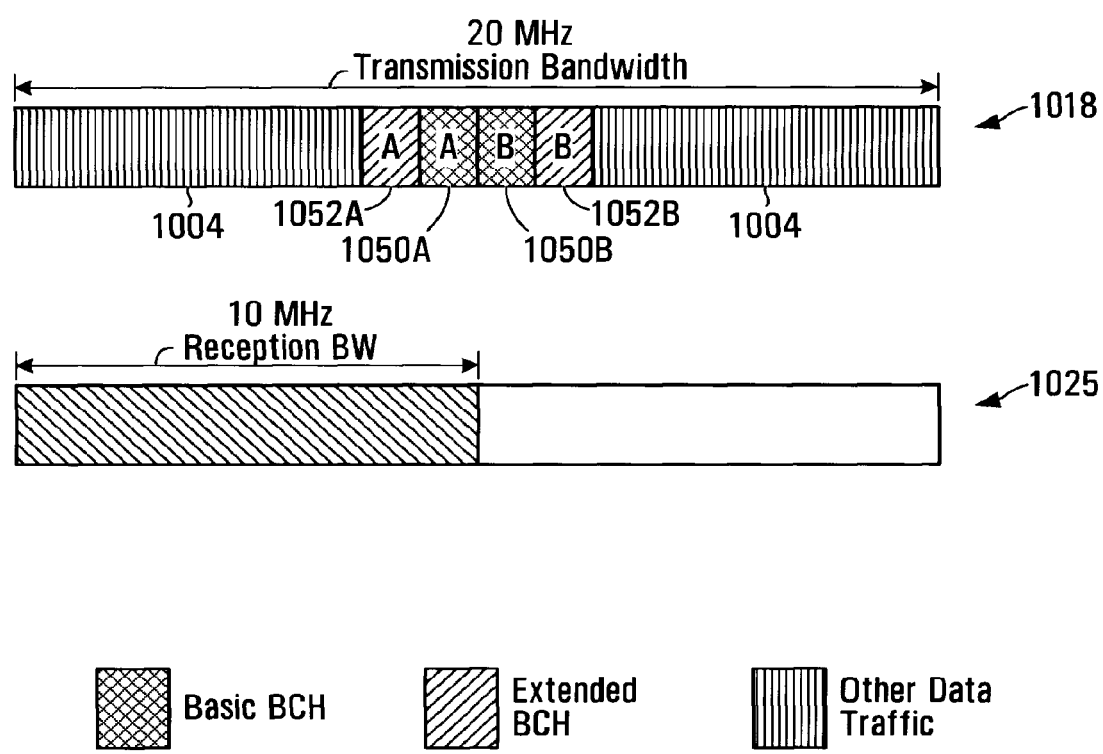
FIG. 10 is a diagram illustrating a spectrum allocation for a BCH for 20 MHz transmission bandwidth.

This example is shown in FIG. 10 which is a diagram illustrating a spectrum allocation for a BCH for 20 MHz transmission bandwidth. In this embodiment, two identical BCHs, comprised of basic BCH A 1050A and Extended BCH A 1050A, and basic BCH B 1050B and Extended BCH B 1052B, are transmitted in the lower band and the upper band of a 20 MHz system bandwidth spectrum 1018 separately. For the sake of clarity, basic BCH A 1050A and basic BCH B 1050B are both being represented by basic BCH 1050 in the same shading Likewise, Extended BCH A 1052A and Extended BCH B 1052B are both being represented by basic BCH 1050 in the same shading. Other data traffic 1004 occupies the remainder of the spectrum in both the upper band and lower band. In the lower half of the figure, a 10 MHz reception bandwidth 1025 for a UE is shown. The spectrum allocation displayed in FIG. 10 for various system bandwidths is merely illustrative of one example of this embodiment of the invention. For example, basic BCH A 1050A and Extended BCH A 1050A, and basic BCH B 1050B and Extended BCH B 1052B could be transmitted alternatively in the lower band the upper band.

Time Domain Structure for SCH and BCH

According to an embodiment of the invention common pilots may be used as a SCH or part of a SCH for OFDMA. According to one embodiment, the common pilots are used as a synchronization channel for DL communications as follows:

Reuse some or all common pilot sub-carriers to transmit SCH, i.e. the PSC and the SSC. This reduces overhead and pilot density may be changed according to the channel condition. For TDM based pilot format, common pilot symbols may be modulated by primary common Sync sequence (PSS) and secondary cell specific Sync sequence (SSS) alternatively. For scattered pilot format, common pilot sub-carriers may be shared by PSC and SSC.

In a first option, scattered pilots in each TTI may assigned to the PSC and SSC. For example, the pilot sub-carriers in the first symbol (or symbol pair) may be assigned to SSC and the pilot sub-carriers in the 4th (and 5th) symbols may be assigned to PSC. In a second option, the pilot sub-carriers in the 4th (and 5th) symbols in the last TTI per frame are used for PSC. To enable the fast system access, only half of the sub-carriers may be modulated.

Figure 11A:
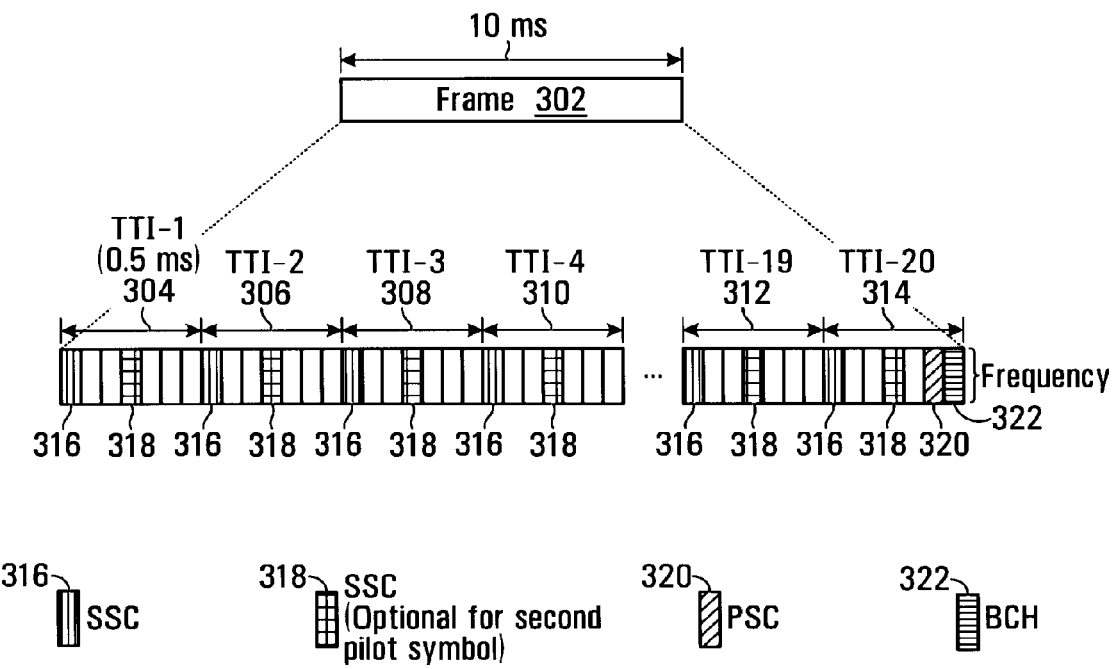
FIG. 11A is a diagram of an example frame used in accordance with one embodiment of the invention.

FIG. 11A is a diagram of an example frame 302 for transmission used in accordance with one embodiment of the invention. More particularly, FIG. 11A illustrates a first embodiment where there are two types of SCH, a PSC and an SSC, in a system bandwidth greater than or equal to 5 MHz. FIG. 11A is only one example of a frame structure that can be used in accordance with this embodiment of the invention.

Shown is frame 302 which in this example of 10 ms duration. Not shown is frame N−1 which precedes frame 302 and Frame N+1 which follows frame 302. Frame 302 is comprised of a plurality of Transmission Time Intervals (TTI) TTI-1 304, TTI-2 306, TTI-3 308, TTI-4 310, TTI-19 312 and TTI-20 314. For the sake of clarity, the TTIs between TTI-4 310 and TTI-19 312 are not shown. In this representative example, each TTI is of 0.5 ms duration, though 0.5 ms TTI is only an example. Therefore, in this example, there are a total of 20 TTIs in frame 302. Each TTI comprises seven OFDM symbols In this embodiment, SSC 316 is transmitted in an OFDM symbol located at the beginning of each TTI in frame 302. BCH 322 is transmitted in an OFDM symbol located at the end of TTI-20 314. PSC 320 is transmitted in an OFDM symbol located immediately preceding BCH 322 in TTI-20 318. Optionally, SSC 318 can also be transmitted in an OFDM symbol located in the middle of each TTI.

One benefit to locating cell specific synchronization channel such as SSC 316 at the beginning of each TTI is that UE's for which there is no traffic in the remaining six symbols need not process these latter symbols. It is not necessary to locate synchronization information in the first OFDM symbol to realize a benefit. Instead, benefits can be achieved by locating such information in a dedicated OFDM symbol. The SSC can be used as pilots to assist channel estimation, channel quality measurement and cell search. There is a power saving feature for a UE which only needs to do the cell search and the channel quality measurement.

Figure 11B:
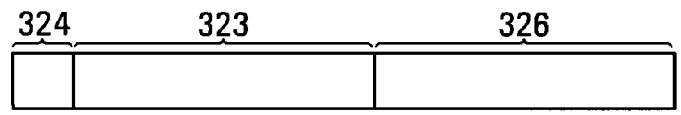
FIG. 11D is a diagram of a time domain structure of a PSC.
FIG. 11C is a diagram of Secondary Cell specific Sync Channel (SSC) and PSC locations for a Time Division Multiplex (TDM) based pilot design.
FIG. 11E is a diagram of a one antenna and a four antenna irregular diamond lattice scattered pilot pattern for OFDM symbols carrying a PSC.

In FIG. 11B, the time domain structure of PSC 320 is shown. As illustrated, PSC 320 is comprised of prefix 324, following by two identical parts 323 and 326. Prefix 324 may be a cyclic prefix. This is only one embodiment and it is not absolutely necessary for PSC 320 to have two identical parts.

Figure 11C:
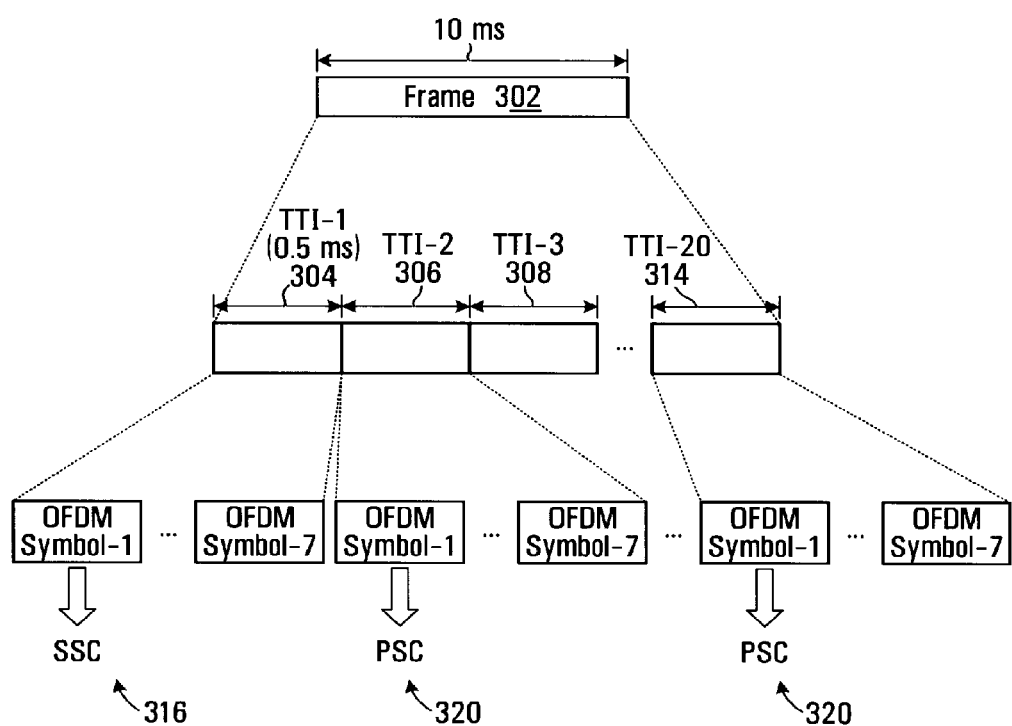

FIG. 11C illustrates another example of SSC and PSC locations for a TDM based pilot design. In this embodiment, SSC 316 is transmitted in the first OFDM symbol of each TTI in frame 302. PSC 320 is transmitted in the first OFDM symbol of each TTI other than TTI-1 304 (i.e. TTI-2 306, TTI-3 308, . . . TTI-20 314).

Figure 11D:
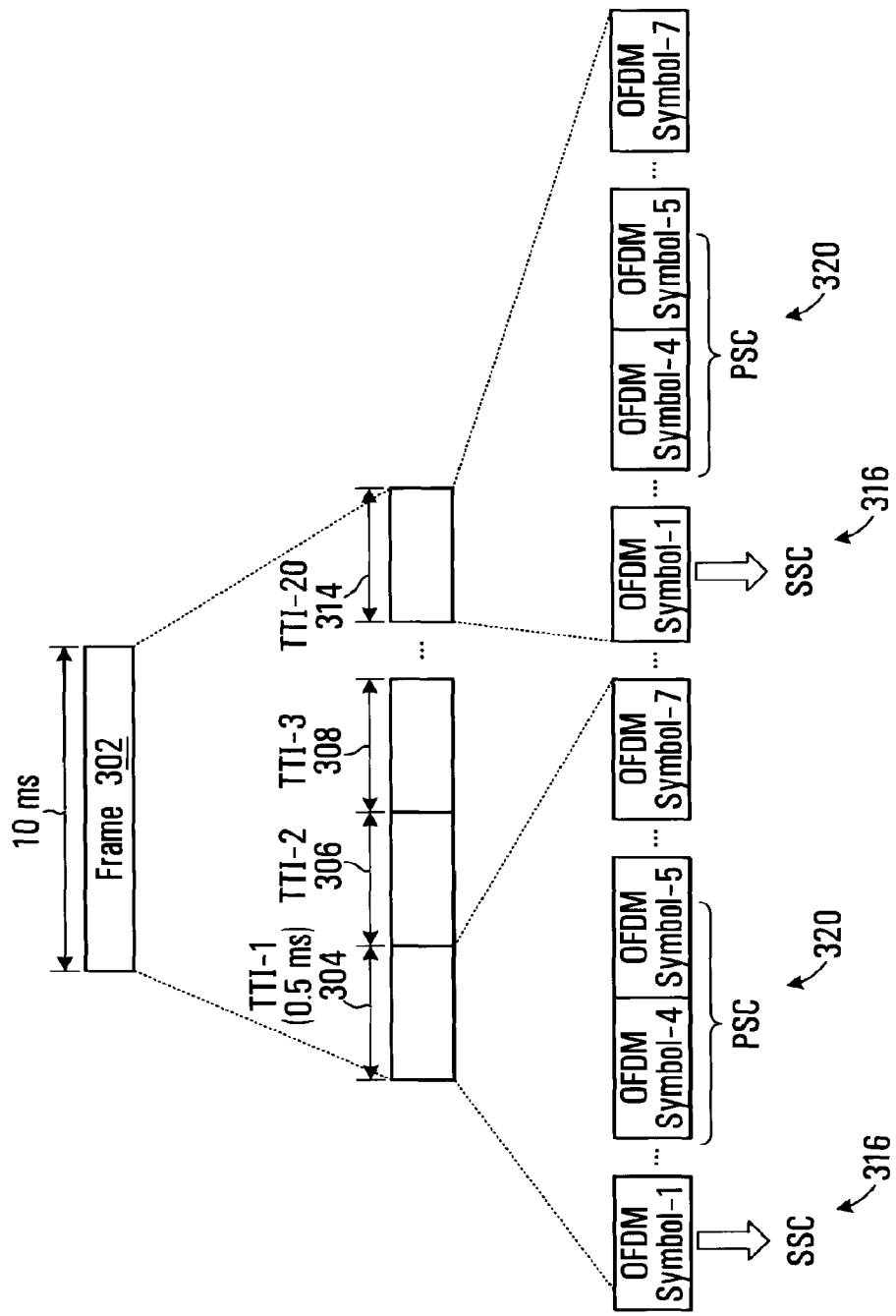

FIG. 11D illustrates SSC and PSC locations for a scattered pilot design. In this embodiment, SSC 316 is transmitted in the first OFDM symbol of TTI-1 304 and in the first OFDM symbol of TTI-20 314 of frame 302. PSC 320 is transmitted in the fourth and fifth OFDM symbols of TTI-1 304 and TTI-20 314.

Figure 11E:
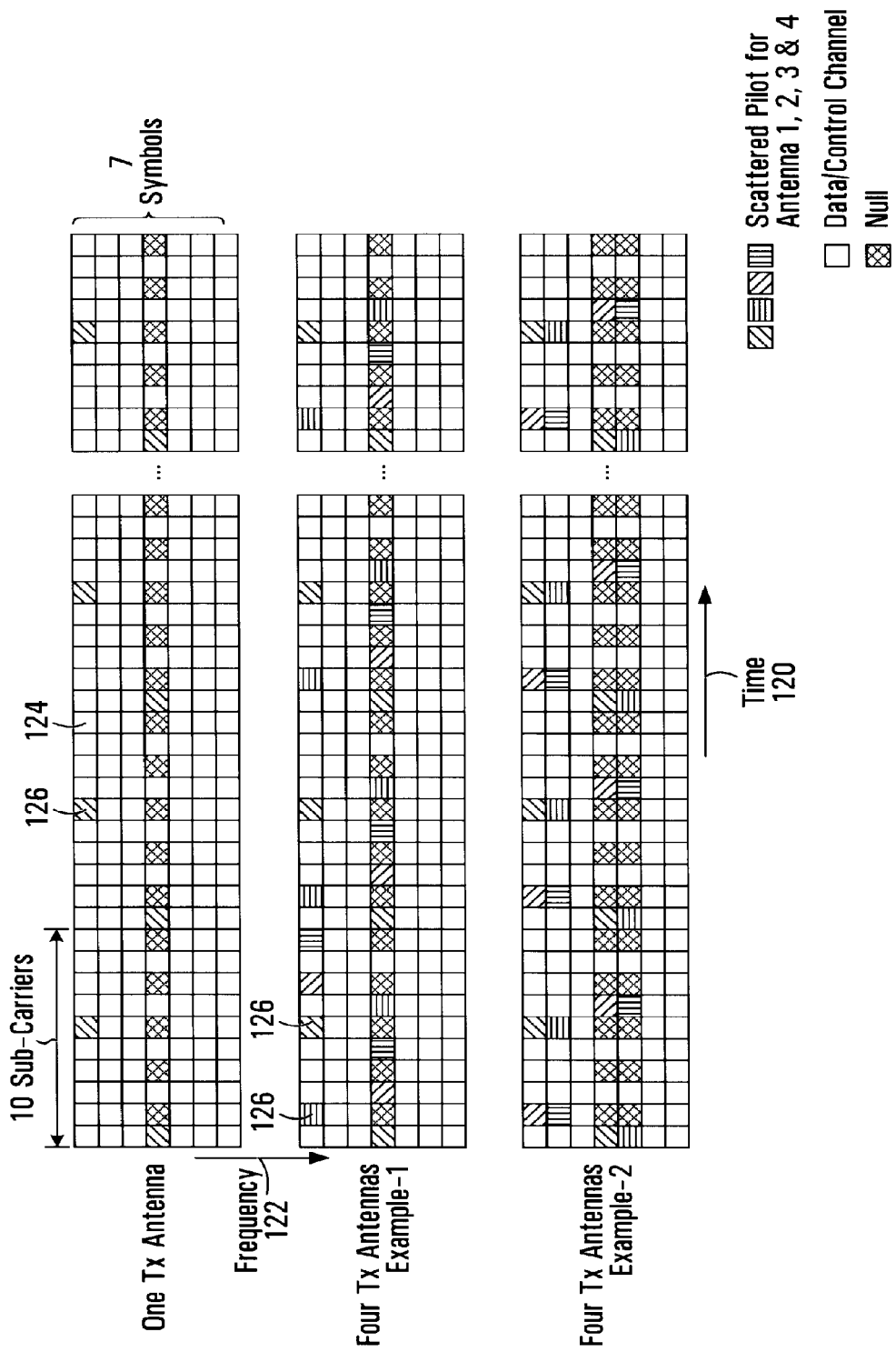

FIG. 11E is an example pilot pattern which can be used in accordance with one embodiment of the present invention. Pilot and data symbols are spread over an OFDM sub-frame in a time direction 120 and a frequency direction 122. Most symbols within the OFDM sub-frame are data symbols 124. Pilot symbols 126 are inserted into some of the OFDM symbols in each TTI. The PSC and SSC can be transmitted over these symbols.

Figure 12A:
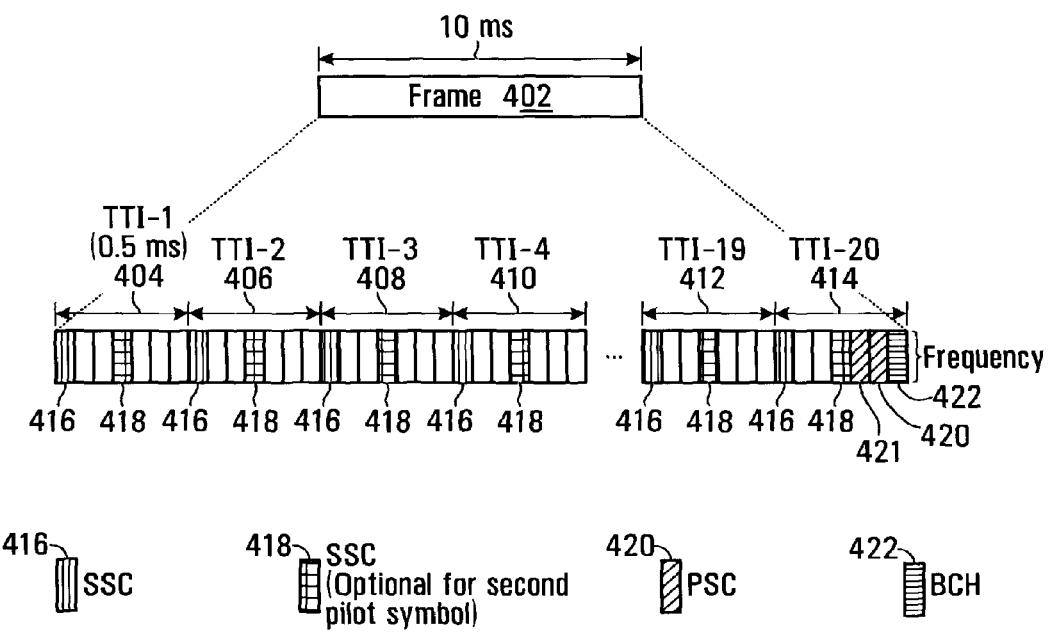
FIG. 12A is a diagram of an example frame used in accordance with one embodiment of the invention.

FIG. 12A is a diagram of an example frame 402 used in accordance with one embodiment of the invention. More particularly, FIG. 12A illustrates a second embodiment, in a Type-2 system, i.e. a system bandwidth less than 5 MHz. FIG. 12A is only one example of a frame structure that can be used in accordance with this embodiment of the invention.

Shown is frame 402 which in this example of 10 ms duration. Not shown is frame N-1 which precedes frame 402 and Frame N+1 which follows frame 402. Frame 402 is comprised of TTI-1 404, TTI-2 406, TTI-3 408, TTI-4 410, TTI-19 412 and TTI-20 414. For the sake of clarity, the TTIs between TTI-4 410 and TTTi-19 412 are not shown. In this representative example, each TTI is of 0.5 ms duration. Therefore, in this example, there are a total of 20 TTIs frame 402.

In this embodiment, SSC 416 is transmitted in a slot located at the beginning of each TTI in frame 402. BCH 422 is transmitted in a slot located at the end of TTI-20 414. A first PSC 420 is transmitted in a slot located immediately preceding BCH 322 in TTI-20 318. A second PSC 421 is transmitted immediately preceding PSC 420. Optionally, SSC 318 can also be transmitted in a slot in the middle of each TTI.

Figure 12B:
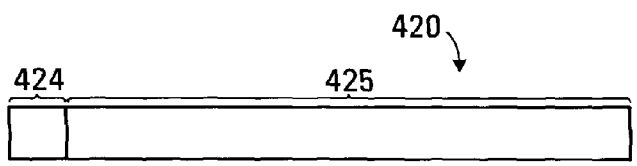
FIG. 12B is a diagram of the time domain structure for two PSC locations used in accordance with one embodiment of the invention.

In FIG. 12B, the time domain structure of PSC 420 and PSC 421 is shown. As illustrated, PSC 420 and PSC 421 are both comprised of prefix 424, following by part 425.

Figure 13:
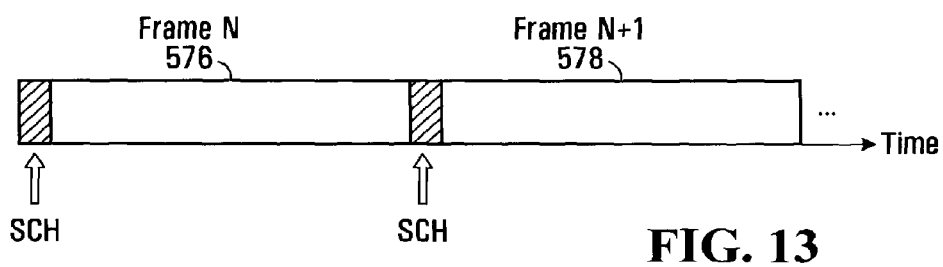
FIG. 13 is a diagram of time domain SCH multiplexing.

FIG. 13 is a diagram of time domain SCH multiplexing. As shown, SCH 575 is illustrated to be transmitted periodically. As illustrated, SCH 575 is transmitted in a slot at the beginning of each of Frame N 576 and Frame N+1 578. For the sake of clarity, the preceding and succeeding frames are not illustrated.

Initial Access Procedure

In general, the initial access procedure between a UE and a BTS comprises the following steps:

1. Primary SCH bandwidth identification: SCH bandwidth selection based on UE's capability and/or system bandwidth.

Option-1:

UE determines the type of SCH according to its capability. UE then detects the Primary SCH using the bandwidth determined by the SCH type.

Option-2:

UE detects the Primary SCH using fs and Nfft determined by the basic SCH bandwidth. Multiple basic SCH may be detected if both the system bandwidth and UE capability are above certain multiples of bandwidth of the basic SCH.

2. Frame acquisition. Coarse timing synchronization based on time domain repeated primary SCH structure.

3. Timing acquisition
4. Frequency acquisition
5. System bandwidth identification
6. BCH detection
7. Cell identification and selection
8. Fine frequency synchronization
9. Fine timing verification Note that the order of steps 5 and 6 above can be exchanged. For example the system bandwidth information can be obtained from BCH if BCH can be decoded at first.

Figure 14:
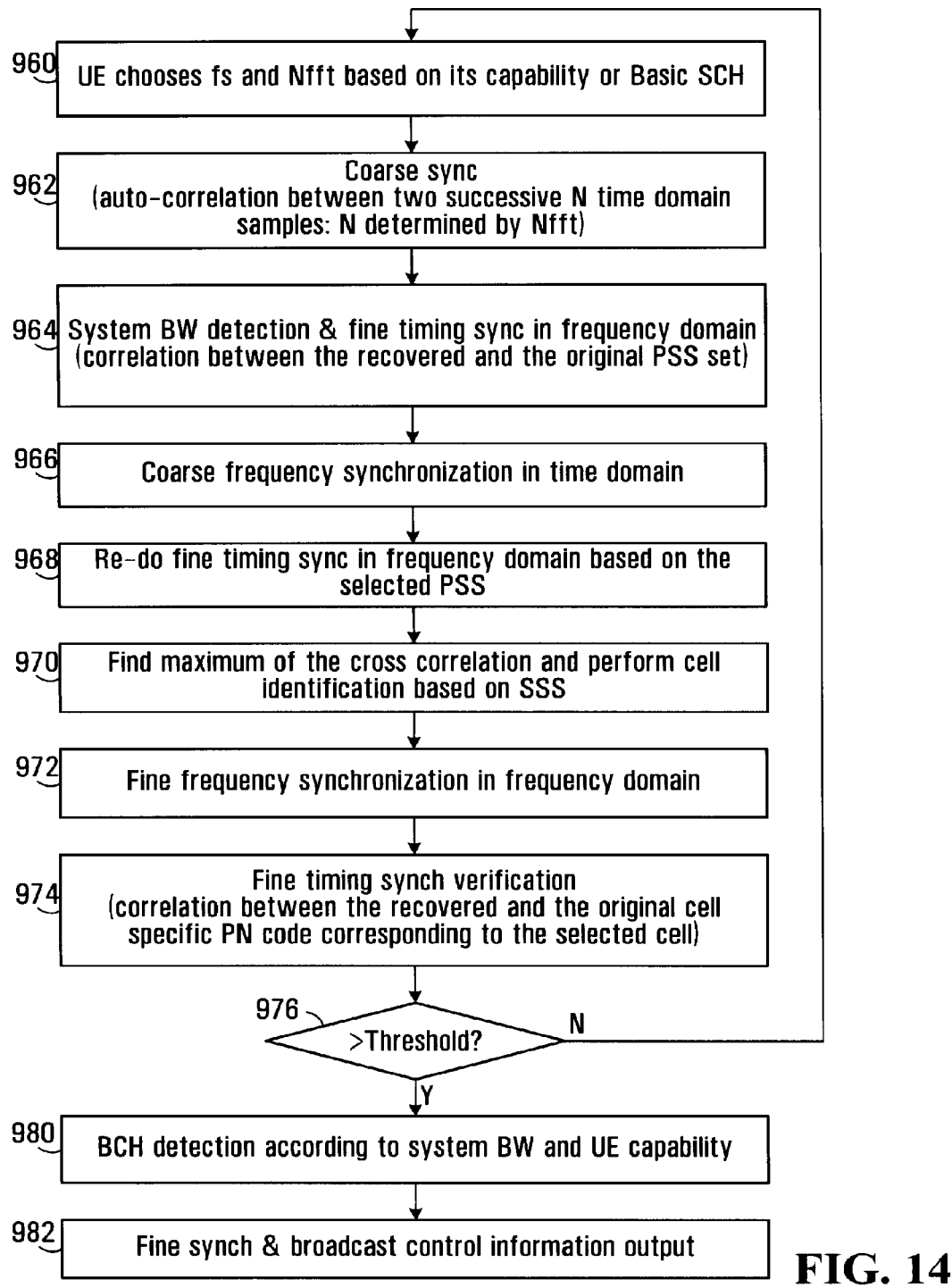
FIG. 14 is a flow chart of the possible steps that could be carried out in connection with an initial access procedure between a UE and a BTS.

FIG. 14 is a flow chart of the possible steps that could be carried out in connection with an initial access procedure between an UE and a BTS. At step 960, a UE determines the type of SCH according to its capability. The UE detects the Primary SCH using the bandwidth (or sampling frequencies and FFT size (Nfft)) determined by the SCH type. Alternatively, the UE detects the Primary SCH using frequencies and Nfft determined by the basic SCH bandwidth. Multiple basic SCH may be detected if both the system bandwidth and UE capability are above certain times the bandwidth of the basic SCH.

At step 962, frame acquisition takes place. Coarse timing synchronization is based on time domain repeated primary SCH structure. At step 964, system bandwidth detection and fine timing acquisition takes place.

The system bandwidth information is carried by the Primary synchronization sequences, for example there are several sequences which corresponding to different system BW. At step 966, coarse frequency synchronization in the time domain takes place. At step 968, fine timing is the frequency domain is carried out based on selected PSS. At step 970, the UE find the maximum of the cross correlation and performs cell correlation based on SSS.

At step 972, fine frequency synchronization is performed in the frequency domain. At step 974, fine timing synchronization verification is performed (i.e. a correlation between the recovered and the original cell specific PN code corresponding to the selected cell). At step 976, an evaluation is performed as to whether the correlation value is above a certain threshold. If not, the procedure is repeated at step 960. If so, there is BCH detection according to system bandwidth and UE capability at step 980. At step 982, the fine sync and broadcast control information is output.

In other embodiments, a spectrum arrangement of the SCH and BCH is set out. As noted above, a UE needs to detect the SCH and BCH during initial access. However, such connectivity is also required during the connected mode (i.e. there is an always-on connection between the UE and the BTS) and the idle mode (i.e. the UE is still connected to the BTS, but not receiving or demodulating any downlink signals during the packet transmission intermission interval, and thus power is saved).

During initial access, the UE first detects the central part of the spectrum (i.e. center carrier frequency) regardless of the transmission bandwidth of the UE and that of the BTS. Transmission is then initiated using the assigned spectrum.

In accordance with this embodiment, a UE can detect the SCH and BCH in the connected and idle mode without returning to the center carrier frequency. Transmit diversity can be applied to the SCH and BCH to improve the coverage when there are more than one transmit antenna present in BTS, though the transmit diversity scheme should be in some cases transparent to the UE, at least for the initial access.

Transmit Diversity Scheme for BCH

In yet another embodiment, a transmit diversity scheme for a BCH is described. Transmit diversity can be applied by a BTS with more than one Tx antenna to improve the coverage.

Candidate transmit diversity schemes include (i) Block code based transmit diversity. With this transmit diversity scheme, knowledge of the number of transmit antennas is needed by the UE, (ii) Frequency switched transmit diversity (sub-carrier based FSTD). With this transmit diversity scheme, there is no need for the UE to know the number of transmit antennas if the channel estimation is done based on SCH with the similar structure, and (iii) Cyclic delay diversity (CDD). Blind detection may be required for channel estimation if there is no antenna configuration information, and (iv) Time switched transmit diversity (symbol based TSTD). In this case, more than one BCH symbol is required to achieve the diversity.

Usually, the UE has no a priori knowledge of the number of transmit antennas when decoding a BCH. It is desired that the transmit diversity scheme be transparent to UE, at least for the initial BCH detection.

Two options for a Tx diversity scheme for BCH are preferred: (i) in Option 1: Either FSTD or CDD can be used to decode the basic BCH and the Extended BCH. (ii) In Option 2: Either of FSTD and CDD can be used to decode the basic BCH, and block code based transmit diversity is used to decode the Extended BCH. In Option 2, the UE will detect the number of transmit antennas from the basic BCH. The UE will decode the Extended BCH accordingly.

Where the antenna configuration can be obtained before the decoding of BCH, in this case a block code based transmit diversity scheme can be applied to both the basic BCH and the Extended BCH. For FSTD, the sub-carriers used to transmit the data are mapped to different antennas alternatively on the sub-carrier base. For example, the odd indexed sub-carriers are mapped onto antenna-1 and the even indexed sub-carriers are mapped onto antenna-2. The mapping could be swapped between antennas in different transmission instances.

Access Procedure

Figure 15:
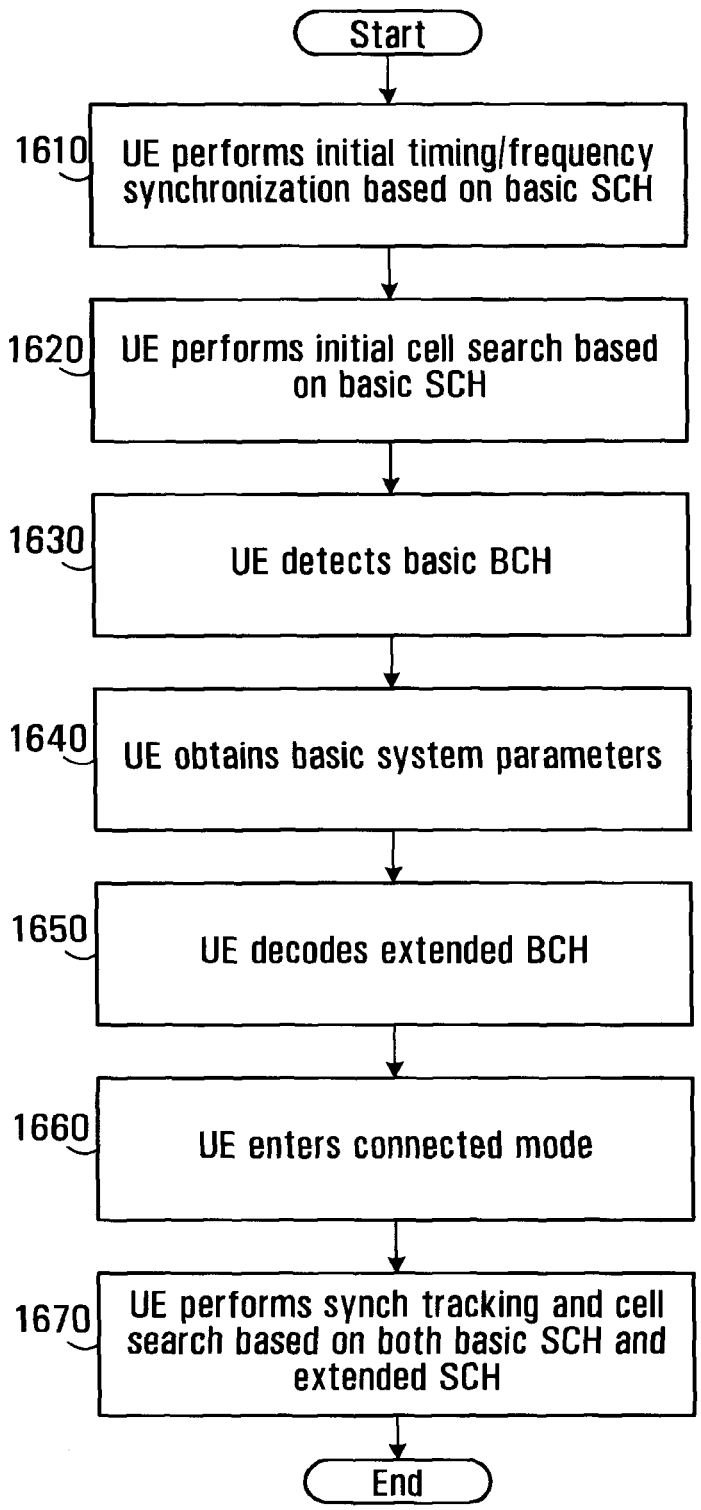
FIG. 15 is a flow chart of the steps carried out by a UE to access the SCH and BCH in one embodiment.

In another implementation, an access procedure is described. A flow chart of the steps carried out by a UE to access the SCH and BCH are set forth in FIG. 15. At step 1610, a UE performs an initial timing/frequency synchronization based on the basic SCH. At step 1620, the UE performs initial cell search based on the basic SCH. At step 1630, the UE detects the basic BCH. At step 1640, the UE obtains basic system parameters. At step 1650, the UE decodes the Extended BCH. At step 1660, the UE enters the connected mode. Finally, at step 1670, the UE performs Sync tracking and cell search based on both the basic SCH and the Extended SCH.

What has been described is merely illustrative of the application of the principles of the invention. Other arrangements and methods can be implemented by those skilled in the art without departing from the spirit and scope of the present invention.

The invention claimed is:

1. A user equipment device (UE), comprising:
   at least one wireless radio;
   one or more antennas coupled to the at least one wireless radio;
   one or more processing elements; and
   one or more memories having program instructions stored thereon that are executable by the one or more processing elements to cause the UE to:
      receive, via a wireless communication system having a system bandwidth, at least a synchronization channel (SCH), wherein the synchronization channel comprises a primary synchronization channel and a secondary synchronization channel;
   wherein the primary synchronization channel is modulated by at least one primary synchronization sequence, wherein the at least one primary synchronization sequence received is a sequence selected from a set of two or more possible primary synchronization sequences common to multiple cells.

2. The UE of claim 1, wherein the secondary synchronization channel is modulated by at least one secondary synchronization sequence that is cell-specific.

3. The UE of claim 1, wherein the primary synchronization channel is located at a center of the system bandwidth.

4. The UE of claim 1, wherein the SCH is less than the system bandwidth and wherein a bandwidth of the SCH is fixed for a plurality of different system bandwidths.

5. The UE of claim 1, wherein the instructions are further executable to cause the UE to:
   receive a broadcast-control channel (BCH), wherein a bandwidth of the BCH is less than the system bandwidth, wherein the BCH comprises system related information.

6. The UE of claim 5, wherein the instructions are further executable to cause the UE to:
   acquire frame timing from the SCH; and
   detect the BCH, wherein the primary synchronization channel is transmitted in an OFDM symbol located immediately preceding broadcast control channel.

7. The UE of claim 5, wherein the instructions are further executable to cause the UE to:
   decode the BCH, wherein the UE does not have knowledge of the number of antennas used for transmission of the BCH prior to decoding the BCH.

8. The UE of claim 5, wherein the instructions are further executable to cause the UE to:
   obtain information specifying the system bandwidth from the BCH.

9. The UE of claim 5, wherein the instructions are further executable to cause the UE to:
   determine a number of antennas in the system from the BCH; and
   decode an extended BCH based on the determined number of antennas.

10. The UE of claim 9, wherein block code based transmit diversity has been applied to the extended BCH.

11. A method, comprising:
    receiving, by a user equipment device (UE) via a wireless communication system having a system bandwidth, at least a synchronization channel (SCH), wherein the synchronization channel comprises a primary synchronization channel and a secondary synchronization channel;
    wherein the primary synchronization channel is modulated by at least one primary synchronization sequence, wherein the at least one primary synchronization sequence received is a sequence selected from a set of two or more possible primary synchronization sequences common to multiple cells.

12. The method of claim 11, wherein the secondary synchronization channel is modulated by at least one secondary synchronization sequence that is cell-specific.

13. The method of claim 11, wherein the primary synchronization channel is located at a center of the system bandwidth.

14. The method of claim 11, wherein the SCH is less than the system bandwidth and wherein a bandwidth of the SCH is fixed for a plurality of different system bandwidths.

15. The method of claim 11, further comprising:
    receiving a broadcast-control channel (BCH), wherein a bandwidth of the BCH is less than the system bandwidth, wherein the BCH comprises system related information.

16. The method of claim 15, further comprising:
    acquiring frame timing from the SCH; and
    detecting the BCH, wherein the primary synchronization channel is transmitted in an OFDM symbol located immediately preceding broadcast control channel.

17. The method of claim 15, further comprising:
    decoding the BCH, wherein the UE does not have knowledge of the number of antennas used for transmission of the BCH prior to decoding the BCH.

18. The method of claim 15, further comprising:
    obtaining information specifying the system bandwidth from the BCH.

19. The method of claim 15, further comprising:
    determining a number of antennas in the system from the BCH; and
    decoding an extended broadcast control channel based on the determined number of antennas.

20. A non-transitory computer-readable medium having instructions stored thereon that are executable by a computing device to perform operations comprising:
    receiving, via a wireless communication system having a system bandwidth, at least a synchronization channel (SCH), wherein the synchronization channel comprises a primary synchronization channel and a secondary synchronization channel;
    wherein the primary synchronization channel is modulated by at least one primary synchronization sequence, wherein the at least one primary synchronization sequence received is a sequence selected from a set of two or more possible primary synchronization sequences common to multiple cells.

* * * * *